US012346712B1

(12) United States Patent
Eberhardt et al.

(10) Patent No.: US 12,346,712 B1
(45) Date of Patent: Jul. 1, 2025

(54) ARTIFICIAL INTELLIGENCE APPLICATION ASSISTANT

(71) Applicant: Samsara Inc., San Francisco, CA (US)

(72) Inventors: Sven Eberhardt, Seattle, WA (US); Brian Westphal, Livermore, CA (US); Yangyong Zhang, San Francisco, CA (US); Allen Lu, Issaquah, WA (US); Nathan Hurst, Seattle, WA (US); Harry Lu, San Mateo, CA (US); Evan Welbourne, Seattle, WA (US); John Bicket, San Francisco, CA (US); Sanjit Biswas, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/624,774

(22) Filed: Apr. 2, 2024

(51) Int. Cl.
*G06F 9/451* (2018.01)
*G01C 21/34* (2006.01)
(Continued)

(52) U.S. Cl.
CPC ............. *G06F 9/453* (2018.02); *G01C 21/34* (2013.01); *G06F 40/20* (2020.01); *G08G 1/20* (2013.01)

(58) Field of Classification Search
CPC ...... G06N 3/0455; G06N 20/00; G06N 3/006; G06N 3/0442; G06N 3/045; G06N 3/0475;
(Continued)

(56) References Cited

U.S. PATENT DOCUMENTS 4,671,111 A 6/1987 Lemelson
5,825,283 A 10/1998 Camhi
(Continued)

FOREIGN PATENT DOCUMENTS

CN 111047179 A 4/2020
DE 10 2004 015 221 A1 10/2005
(Continued)

OTHER PUBLICATIONS

"Cargo Monitor", Samsara Inc., accessed Feb. 21, 2024 [publication date unknown], in 2 pages. URL: https://www.samsara.com/products/models/cargo-monitor.
(Continued)

*Primary Examiner* — Luis A Sitiriche
(74) *Attorney, Agent, or Firm* — Knobbe, Martens, Olson & Bear, LLP

(57) ABSTRACT

An Applicant Assistant System may receive, from a user device, a user input indicating a query or task associated with information displayed in a user interface. The device may determine one or more components associated with the user interface and access component metadata of the determined one or more components, the component metadata for each of the one or more components indicating one or more of a fact, a data link, or an action. A prompt comprising at least some of the component metadata, at least some context information, and an indication of one or more available response elements may be provided to a large language model (LLM). The LLM may response with one or more response elements that may be processed by the System, such as to cause updates to the user interface on the user device.

18 Claims, 12 Drawing Sheets

(51) Int. Cl.
*G06F 40/20* (2020.01)
*G08G 1/00* (2006.01)

(58) Field of Classification Search
CPC ...... G06N 3/096; G06N 3/0495; G06N 3/044; G06N 3/048; G06N 3/08; G06N 3/084; G06N 3/0895; G06N 3/09; G06N 5/022; G10L 15/22; G10L 15/183; G10L 2015/228; G10L 15/18; G10L 15/1815; G10L 2015/223; G10L 2015/227; G10L 13/08; G10L 15/08; G10L 15/19; G10L 13/027; G10L 15/1822; G10L 15/26; G10L 13/00; G10L 13/0335; G10L 13/047; G10L 13/02; G10L 13/033; G10L 13/10; G10L 15/063; G10L 15/16; G10L 2015/221; G10L 25/57
See application file for complete search history.

(56) References Cited

U.S. PATENT DOCUMENTS

| | | | |
|---|---|---|---|
| 5,917,433 | A | 6/1999 | Keillor et al. |
| 6,064,299 | A | 5/2000 | Lesesky et al. |
| 6,098,048 | A | 8/2000 | Dashefsky et al. |
| 6,157,864 | A | 12/2000 | Schwenke et al. |
| 6,253,129 | B1 | 6/2001 | Jenkins et al. |
| 6,317,668 | B1 | 11/2001 | Thibault et al. |
| 6,411,203 | B1 | 6/2002 | Lesesky et al. |
| 6,421,590 | B2 | 7/2002 | Thibault |
| 6,452,487 | B1 | 9/2002 | Krupinski |
| 6,505,106 | B1 | 1/2003 | Lawrence et al. |
| 6,651,063 | B1 | 11/2003 | Vorobiev |
| 6,714,894 | B1 | 3/2004 | Tobey et al. |
| 6,718,239 | B2 | 4/2004 | Rayner |
| 6,741,165 | B1 | 5/2004 | Langfahl et al. |
| 6,801,920 | B1 | 10/2004 | Wischinski |
| 7,117,075 | B1 | 10/2006 | Larschan et al. |
| 7,139,780 | B2 | 11/2006 | Lee et al. |
| 7,209,959 | B1 | 4/2007 | Campbell et al. |
| 7,233,684 | B2 | 6/2007 | Fedorovskaya et al. |
| 7,386,376 | B2 | 6/2008 | Basir et al. |
| 7,389,178 | B2 | 6/2008 | Raz et al. |
| 7,398,298 | B2 | 7/2008 | Koch |
| 7,492,938 | B2 | 2/2009 | Brinson, Jr. et al. |
| 7,526,103 | B2 | 4/2009 | Schofield et al. |
| 7,555,378 | B2 | 6/2009 | Larschan et al. |
| 7,596,417 | B2 | 9/2009 | Fister et al. |
| 7,606,779 | B2 | 10/2009 | Brinson, Jr. et al. |
| 7,715,961 | B1 | 5/2010 | Kargupta |
| 7,769,499 | B2 | 8/2010 | McQuade et al. |
| 7,844,088 | B2 | 11/2010 | Brinson, Jr. et al. |
| 7,859,392 | B2 | 12/2010 | McClellan et al. |
| 7,877,198 | B2 | 1/2011 | Tenzer et al. |
| 7,881,838 | B2 | 2/2011 | Larschan et al. |
| 7,957,936 | B2 | 6/2011 | Eryurek et al. |
| 8,019,581 | B2 | 9/2011 | Sheha et al. |
| 8,024,311 | B2 | 9/2011 | Wood et al. |
| 8,032,277 | B2 | 10/2011 | Larschan et al. |
| 8,140,358 | B1 | 3/2012 | Ling et al. |
| 8,156,108 | B2 | 4/2012 | Middleton et al. |
| 8,156,499 | B2 | 4/2012 | Foulger et al. |
| 8,169,343 | B2 | 5/2012 | Sheha et al. |
| 8,175,992 | B2 | 5/2012 | Bass et al. |
| 8,230,272 | B2 | 7/2012 | Middleton et al. |
| 8,260,489 | B2 | 9/2012 | Nielsen et al. |
| 8,417,402 | B2 | 4/2013 | Basir |
| 8,442,508 | B2 | 5/2013 | Harter et al. |
| 8,457,395 | B2 | 6/2013 | Boncyk et al. |
| 8,509,412 | B2 | 8/2013 | Sheha et al. |
| 8,543,625 | B2 | 9/2013 | Middleton et al. |
| 8,560,164 | B2 | 10/2013 | Nielsen et al. |
| 8,615,555 | B2 | 12/2013 | Koch |
| 8,625,885 | B2 | 1/2014 | Brinson, Jr. et al. |
| 8,626,568 | B2 | 1/2014 | Warkentin et al. |
| 8,633,672 | B2 | 1/2014 | Jung et al. |
| 8,669,857 | B2 | 3/2014 | Sun et al. |
| 8,682,572 | B2 | 3/2014 | Raz et al. |
| 8,706,409 | B2 | 4/2014 | Mason et al. |
| 8,831,825 | B2 | 9/2014 | Shah et al. |
| 8,836,784 | B2 | 9/2014 | Erhardt et al. |
| 8,918,229 | B2 | 12/2014 | Hunt et al. |
| 8,953,228 | B1 | 2/2015 | Mehers |
| 8,989,914 | B1 | 3/2015 | Nemat-Nasser et al. |
| 8,989,959 | B2 | 3/2015 | Plante et al. |
| 8,996,240 | B2 | 3/2015 | Plante |
| 9,024,744 | B2 | 5/2015 | Klose et al. |
| 9,053,590 | B1 | 6/2015 | Kator et al. |
| 9,137,498 | B1 | 9/2015 | L'Heureux et al. |
| 9,147,335 | B2 | 9/2015 | Raghunathan et al. |
| 9,152,609 | B2 | 10/2015 | Schwartz et al. |
| 9,165,196 | B2 | 10/2015 | Kesavan et al. |
| 9,170,913 | B2 | 10/2015 | Hunt et al. |
| 9,189,895 | B2 | 11/2015 | Phelan et al. |
| 9,230,250 | B1 | 1/2016 | Parker et al. |
| 9,230,437 | B2 | 1/2016 | Brinton et al. |
| 9,280,435 | B2 | 3/2016 | Hunt et al. |
| 9,311,271 | B2 | 4/2016 | Wright |
| 9,344,683 | B1 | 5/2016 | Nemat-Nasser et al. |
| 9,349,228 | B2 | 5/2016 | Ochsendorf et al. |
| 9,384,111 | B2 | 7/2016 | Hunt et al. |
| 9,389,147 | B1 | 7/2016 | Lambert et al. |
| 9,402,060 | B2 | 7/2016 | Plante |
| 9,412,282 | B2 | 8/2016 | Hunt et al. |
| 9,439,280 | B2 | 9/2016 | Chang et al. |
| 9,445,270 | B1 | 9/2016 | Bicket et al. |
| 9,477,639 | B2 | 10/2016 | Fischer et al. |
| 9,477,989 | B2 | 10/2016 | Grimm et al. |
| 9,527,515 | B2 | 12/2016 | Hunt et al. |
| 9,594,725 | B1 | 3/2017 | Cook et al. |
| 9,672,667 | B2 | 6/2017 | Mason et al. |
| 9,688,282 | B2 | 6/2017 | Cook et al. |
| 9,728,015 | B2 | 8/2017 | Kwak |
| 9,761,063 | B2 | 9/2017 | Lambert et al. |
| 9,761,067 | B2 | 9/2017 | Plante et al. |
| 9,811,536 | B2 | 11/2017 | Morris et al. |
| 9,818,088 | B2 | 11/2017 | Penilla et al. |
| 9,846,979 | B1 | 12/2017 | Salnaney et al. |
| 9,849,834 | B2 | 12/2017 | Reed et al. |
| 9,852,625 | B2 | 12/2017 | Victor et al. |
| 9,892,376 | B2 | 2/2018 | Pfeiffer et al. |
| 9,922,567 | B2 | 3/2018 | Molin et al. |
| 9,934,628 | B2 | 4/2018 | Kreiner et al. |
| 9,996,980 | B1 | 6/2018 | Gonzalez et al. |
| 10,015,452 | B1 | 7/2018 | Schofield et al. |
| 10,033,706 | B2 | 7/2018 | Bicket et al. |
| 10,040,459 | B1 | 8/2018 | Kukreja |
| 10,065,652 | B2 | 9/2018 | Shenoy et al. |
| 10,068,392 | B2 | 9/2018 | Cook et al. |
| 10,075,669 | B2 | 9/2018 | Vanman et al. |
| 10,083,547 | B1 | 9/2018 | Tomatsu |
| 10,085,149 | B2 | 9/2018 | Bicket et al. |
| 10,094,308 | B2 | 10/2018 | Kolhouse et al. |
| 10,102,495 | B1 | 10/2018 | Zhang et al. |
| 10,127,810 | B2 | 11/2018 | Durie, Jr. et al. |
| 10,157,321 | B2 | 12/2018 | Becker et al. |
| 10,173,486 | B1 | 1/2019 | Lee et al. |
| 10,173,544 | B2 | 1/2019 | Hendrix et al. |
| 10,196,071 | B1 | 2/2019 | Rowson et al. |
| 10,206,107 | B2 | 2/2019 | Bicket et al. |
| 10,223,935 | B2 | 3/2019 | Sweany et al. |
| 10,275,959 | B2 | 4/2019 | Ricci |
| 10,286,875 | B2 | 5/2019 | Penilla et al. |
| 10,290,036 | B1 | 5/2019 | Gella et al. |
| 10,311,749 | B1 | 6/2019 | Kypri et al. |
| 10,336,190 | B2 | 7/2019 | Yokochi et al. |
| 10,388,075 | B2 | 8/2019 | Schmirler et al. |
| 10,389,739 | B2 | 8/2019 | Solotorevsky |
| 10,390,227 | B2 | 8/2019 | Bicket et al. |
| 10,444,949 | B2 | 10/2019 | Scott et al. |
| 10,445,559 | B2 | 10/2019 | Joseph et al. |
| 10,459,444 | B1 | 10/2019 | Kentley-Klay |
| 10,460,183 | B2 | 10/2019 | Welland et al. |
| 10,460,600 | B2 | 10/2019 | Julian et al. |

(56) References Cited

U.S. PATENT DOCUMENTS

| | | | |
|---|---|---|---|
| 10,471,955 B2 | 11/2019 | Kouri et al. | |
| 10,486,709 B1 | 11/2019 | Mezaael | |
| 10,489,222 B2 | 11/2019 | Sathyanarayana et al. | |
| 10,523,904 B2 | 12/2019 | Mahmoud et al. | |
| 10,573,183 B1 | 2/2020 | Li et al. | |
| 10,579,123 B2 | 3/2020 | Tuan et al. | |
| 10,609,114 B1 | 3/2020 | Bicket et al. | |
| 10,621,873 B1 | 4/2020 | Spiel et al. | |
| 10,623,899 B2 | 4/2020 | Watkins et al. | |
| 10,632,941 B2 | 4/2020 | Chauncey et al. | |
| 10,652,335 B2 | 5/2020 | Botticelli | |
| 10,715,976 B2 | 7/2020 | Hoffner et al. | |
| 10,762,363 B2 | 9/2020 | Watanabe | |
| 10,782,691 B2 | 9/2020 | Suresh et al. | |
| 10,788,990 B2 | 9/2020 | Kim et al. | |
| 10,789,840 B2 | 9/2020 | Boykin et al. | |
| 10,803,496 B1 | 10/2020 | Hopkins | |
| 10,818,109 B2 | 10/2020 | Palmer et al. | |
| 10,827,324 B1 | 11/2020 | Hajimiri et al. | |
| 10,843,659 B1 | 11/2020 | Innocenzi et al. | |
| 10,848,670 B2 | 11/2020 | Gatti et al. | |
| 10,878,030 B1 | 12/2020 | Lambert et al. | |
| 10,956,497 B1 * | 3/2021 | Plymale | G06F 16/56 |
| 10,969,852 B2 | 4/2021 | Tuan et al. | |
| 10,979,871 B2 | 4/2021 | Hajimiri et al. | |
| 10,999,269 B2 | 5/2021 | Bicket et al. | |
| 10,999,374 B2 | 5/2021 | ElHattab et al. | |
| 11,046,205 B1 | 6/2021 | Govan et al. | |
| 11,069,257 B2 | 7/2021 | Palmer et al. | |
| 11,080,568 B2 | 8/2021 | ElHattab et al. | |
| 11,122,488 B1 | 9/2021 | Lloyd et al. | |
| 11,126,910 B1 | 9/2021 | Akhtar et al. | |
| 11,127,130 B1 | 9/2021 | Jain et al. | |
| 11,131,986 B1 | 9/2021 | Gal et al. | |
| 11,132,853 B1 | 9/2021 | Akhtar et al. | |
| 11,137,744 B1 | 10/2021 | Heddleston et al. | |
| 11,142,175 B2 | 10/2021 | Chow et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 11,204,637 B2 | 12/2021 | Tuan et al. | |
| 11,260,878 B2 | 3/2022 | Palmer et al. | |
| 11,341,786 B1 | 5/2022 | Calmer et al. | |
| 11,349,901 B1 | 5/2022 | Duffield et al. | |
| 11,352,013 B1 | 6/2022 | Srinivasan et al. | |
| 11,352,014 B1 | 6/2022 | Srinivasan et al. | |
| 11,356,605 B1 | 6/2022 | Shemet et al. | |
| 11,356,909 B1 | 6/2022 | Lloyd | |
| 11,365,980 B1 | 6/2022 | Akhtar et al. | |
| 11,386,325 B1 | 7/2022 | Srinivasan et al. | |
| 11,436,844 B2 | 9/2022 | Carruthers et al. | |
| 11,451,610 B1 | 9/2022 | Saunders et al. | |
| 11,451,611 B1 | 9/2022 | Saunders et al. | |
| 11,460,507 B2 | 10/2022 | Lloyd et al. | |
| 11,464,079 B1 | 10/2022 | Aschenbener et al. | |
| 11,479,142 B1 | 10/2022 | Govan et al. | |
| 11,494,921 B2 | 11/2022 | ElHattab et al. | |
| 11,522,857 B1 | 12/2022 | Symons et al. | |
| 11,532,169 B1 | 12/2022 | Hassan et al. | |
| 11,558,449 B1 | 1/2023 | Bicket et al. | |
| 11,595,632 B2 | 2/2023 | Tsai et al. | |
| 11,599,097 B1 | 3/2023 | Gal et al. | |
| 11,606,736 B1 | 3/2023 | Lloyd et al. | |
| 11,611,621 B2 | 3/2023 | ElHattab et al. | |
| 11,615,141 B1 | 3/2023 | Hoye et al. | |
| 11,620,909 B2 | 4/2023 | Tsai et al. | |
| 11,627,252 B2 | 4/2023 | Delegard et al. | |
| 11,641,388 B1 | 5/2023 | Saunders et al. | |
| 11,641,604 B1 | 5/2023 | Lloyd | |
| 11,643,102 B1 | 5/2023 | Calmer et al. | |
| 11,659,060 B2 | 5/2023 | Davis et al. | |
| 11,665,223 B1 | 5/2023 | Duffield et al. | |
| 11,669,714 B1 | 6/2023 | Akhtar et al. | |
| 11,671,478 B1 | 6/2023 | Saunders et al. | |

| | | | |
|---|---|---|---|
| 11,674,813 B1 | 6/2023 | Chung et al. | |
| 11,675,042 B1 | 6/2023 | Lloyd et al. | |
| 11,683,579 B1 | 6/2023 | Symons et al. | |
| 11,688,211 B1 | 6/2023 | Calmer et al. | |
| 11,694,317 B1 | 7/2023 | Jain et al. | |
| 11,704,984 B1 | 7/2023 | ElHattab et al. | |
| 11,709,500 B2 | 7/2023 | Lloyd et al. | |
| 11,710,409 B2 | 7/2023 | Nanda et al. | |
| 11,720,087 B1 | 8/2023 | Heddleston et al. | |
| 11,727,054 B2 | 8/2023 | Grandhi et al. | |
| 11,731,469 B1 | 8/2023 | McGillan | |
| 11,736,312 B1 | 8/2023 | Xiao et al. | |
| 11,741,760 B1 | 8/2023 | Dubin et al. | |
| 11,748,377 B1 | 9/2023 | Zhang et al. | |
| 11,752,895 B1 | 9/2023 | Govan et al. | |
| 11,756,346 B1 | 9/2023 | Wu et al. | |
| 11,756,351 B1 | 9/2023 | Akhtar et al. | |
| 11,758,096 B2 | 9/2023 | Shah et al. | |
| 11,776,328 B2 | 10/2023 | Yang et al. | |
| 11,780,446 B1 | 10/2023 | Srinivasan et al. | |
| 11,782,930 B2 | 10/2023 | McGee et al. | |
| 11,787,413 B2 | 10/2023 | Tsal et al. | |
| 11,798,187 B2 | 10/2023 | Zaheer et al. | |
| 11,798,298 B2 | 10/2023 | Hassan et al. | |
| 11,800,317 B1 | 10/2023 | Dugar et al. | |
| 11,838,884 B1 | 12/2023 | Dergosits et al. | |
| 11,842,577 B1 | 12/2023 | Harrison et al. | |
| 11,847,911 B2 | 12/2023 | ElHattab et al. | |
| 11,855,801 B1 | 12/2023 | Stevenson et al. | |
| 11,861,955 B1 | 1/2024 | Dubin et al. | |
| 11,863,712 B1 | 1/2024 | Young et al. | |
| 11,866,055 B1 | 1/2024 | Srinivasan et al. | |
| 11,868,919 B1 | 1/2024 | Zhang et al. | |
| 11,875,580 B2 | 1/2024 | Hassan et al. | |
| 11,875,683 B1 | 1/2024 | Tsai et al. | |
| 11,890,962 B1 | 2/2024 | Govan et al. | |
| 11,937,152 B2 | 3/2024 | Hajimiri et al. | |
| 11,938,948 B1 | 3/2024 | Davis et al. | |
| 11,947,902 B1 * | 4/2024 | Grimshaw | G06N 3/09 |
| 11,959,772 B2 | 4/2024 | Robbins et al. | |
| 11,974,410 B1 | 4/2024 | Lin et al. | |
| 11,975,685 B1 | 5/2024 | Innocenzi et al. | |
| 11,989,001 B1 | 5/2024 | ElHattab et al. | |
| 11,995,546 B1 | 5/2024 | Srinivasan et al. | |
| 11,997,181 B1 | 5/2024 | Davis et al. | |
| 12,000,940 B1 | 6/2024 | Lloyd et al. | |
| 12,106,613 B2 | 10/2024 | Calmer et al. | |
| 12,117,546 B1 | 10/2024 | Lloyd et al. | |
| 12,126,917 B1 | 10/2024 | Shemet et al. | |
| 12,128,919 B2 | 10/2024 | Calmer et al. | |
| 12,140,445 B1 | 11/2024 | Akhtar et al. | |
| 12,150,186 B1 | 11/2024 | Aguilar et al. | |
| 12,165,360 B1 | 12/2024 | Jain et al. | |
| 12,168,445 B1 | 12/2024 | Srinivasan et al. | |
| 12,172,653 B1 | 12/2024 | Akhtar et al. | |
| 12,179,629 B1 | 12/2024 | Govan et al. | |
| 12,197,610 B2 | 1/2025 | Wen et al. | |
| 12,213,090 B1 | 1/2025 | Dergosits et al. | |
| 2002/0061758 A1 | 5/2002 | Zarlengo et al. | |
| 2002/0128751 A1 | 9/2002 | Engstrom et al. | |
| 2002/0169850 A1 | 11/2002 | Batke et al. | |
| 2003/0081935 A1 | 5/2003 | Kirmuss | |
| 2003/0154009 A1 | 8/2003 | Basir et al. | |
| 2004/0093264 A1 | 5/2004 | Shimizu | |
| 2004/0236476 A1 | 11/2004 | Chowdhary | |
| 2004/0236596 A1 | 11/2004 | Chowdhary et al. | |
| 2005/0131585 A1 | 6/2005 | Luskin et al. | |
| 2005/0131646 A1 | 6/2005 | Camus | |
| 2005/0286774 A1 | 12/2005 | Porikli | |
| 2006/0167591 A1 | 7/2006 | McNally | |
| 2007/0050108 A1 | 3/2007 | Larschan et al. | |
| 2007/0173991 A1 | 7/2007 | Tenzer et al. | |
| 2008/0252487 A1 | 10/2008 | McClellan et al. | |
| 2008/0319602 A1 | 12/2008 | McClellan et al. | |
| 2009/0099724 A1 | 4/2009 | Kranz et al. | |
| 2009/0141939 A1 | 6/2009 | Chambers et al. | |
| 2009/0240427 A1 | 9/2009 | Siereveld et al. | |
| 2010/0030586 A1 | 2/2010 | Taylor et al. | |
| 2010/0049639 A1 | 2/2010 | Ferro et al. | |

(56) References Cited

U.S. PATENT DOCUMENTS

2010/0281161 A1 11/2010 Cohn et al.
2011/0060496 A1 3/2011 Nielsen et al.
2011/0093306 A1 4/2011 Nielsen et al.
2011/0234749 A1 9/2011 Alon
2011/0276265 A1 11/2011 Husain
2012/0109418 A1 5/2012 Orber
2012/0194357 A1 8/2012 Ciolli
2012/0201277 A1 8/2012 Tanner et al.
2012/0218416 A1 8/2012 Leny et al.
2012/0235625 A1 9/2012 Takehara
2012/0262104 A1 10/2012 Kirsch
2012/0303397 A1 11/2012 Prosser
2013/0073112 A1 3/2013 Phelan et al.
2013/0162421 A1 6/2013 Inaguma et al.
2013/0162425 A1 6/2013 Raghunathan et al.
2013/0164713 A1 6/2013 Hunt et al.
2013/0211559 A1 8/2013 Lawson et al.
2013/0244210 A1 9/2013 Nath et al.
2013/0250040 A1 9/2013 Vitsnudel et al.
2013/0332004 A1 12/2013 Gompert et al.
2014/0012492 A1 1/2014 Bowers et al.
2014/0095061 A1 4/2014 Hyde
2014/0098060 A1 4/2014 McQuade et al.
2014/0113619 A1 4/2014 Tibbitts et al.
2014/0159660 A1 6/2014 Klose et al.
2014/0195106 A1 7/2014 McQuade et al.
2014/0223090 A1 8/2014 Malone
2014/0278108 A1 9/2014 Kerrigan et al.
2014/0293069 A1 10/2014 Lazar et al.
2014/0328517 A1 11/2014 Gluncic
2014/0337429 A1 11/2014 Asenjo et al.
2014/0354227 A1 12/2014 Tyagi et al.
2014/0354228 A1 12/2014 Williams et al.
2015/0025734 A1 1/2015 Cook et al.
2015/0044641 A1 2/2015 Chauncey et al.
2015/0074091 A1 3/2015 Walkin et al.
2015/0116114 A1 4/2015 Boyles
2015/0226563 A1 8/2015 Cox et al.
2015/0283912 A1 10/2015 Shimizu et al.
2015/0347121 A1 12/2015 Harumoto
2016/0046298 A1 2/2016 DeRuyck et al.
2016/0110066 A1 4/2016 McCormick et al.
2016/0176401 A1 6/2016 Pilkington
2016/0275376 A1 9/2016 Kant
2016/0288744 A1 10/2016 Rutherford et al.
2016/0293049 A1 10/2016 Monahan et al.
2016/0343091 A1 11/2016 Han et al.
2016/0375780 A1 12/2016 Penilla et al.
2017/0039784 A1 2/2017 Gelbart et al.
2017/0060726 A1 3/2017 Glistvain
2017/0102463 A1 4/2017 Hwang
2017/0123397 A1 5/2017 Billl et al.
2017/0124476 A1 5/2017 Levinson et al.
2017/0140603 A1 5/2017 Ricci
2017/0195265 A1 7/2017 Bill et al.
2017/0200061 A1 7/2017 Julian et al.
2017/0263049 A1 9/2017 MacDonald et al.
2017/0263120 A1 9/2017 Durie, Jr. et al.
2017/0278004 A1 9/2017 McElhinney et al.
2017/0286838 A1 10/2017 Cipriani et al.
2017/0291611 A1 10/2017 Innes et al.
2017/0291800 A1 10/2017 Scoville et al.
2017/0323641 A1 11/2017 Shimizu et al.
2017/0332199 A1 11/2017 Elliott et al.
2017/0345283 A1 11/2017 Kwon et al.
2017/0366935 A1 12/2017 Ahmadzadeh et al.
2018/0001771 A1 1/2018 Park et al.
2018/0001899 A1 1/2018 Shenoy et al.
2018/0012196 A1 1/2018 Ricci et al.
2018/0025636 A1 1/2018 Boykin et al.
2018/0063576 A1 3/2018 Tillman et al.
2018/0068206 A1 3/2018 Pollach et al.
2018/0072313 A1 3/2018 Stenneth
2018/0075309 A1 3/2018 Sathyanarayana et al.
2018/0093672 A1 4/2018 Terwilliger et al.
2018/0174485 A1 6/2018 Stankoulov
2018/0234514 A1 8/2018 Rajiv et al.
2018/0247109 A1 8/2018 Joseph et al.
2018/0253109 A1 9/2018 Fontaine et al.
2018/0262724 A1 9/2018 Ross
2018/0295141 A1 10/2018 Solotorevsky
2018/0329381 A1 11/2018 Doh et al.
2018/0356800 A1 12/2018 Chao et al.
2018/0357484 A1 12/2018 Omata
2018/0364686 A1 12/2018 Naidoo et al.
2019/0003848 A1 1/2019 Hoten et al.
2019/0007690 A1 1/2019 Varadarajan et al.
2019/0054876 A1 2/2019 Ferguson et al.
2019/0065951 A1 2/2019 Luo et al.
2019/0077308 A1 3/2019 Kashchenko
2019/0118655 A1 4/2019 Grimes et al.
2019/0120947 A1 4/2019 Wheeler et al.
2019/0174158 A1 6/2019 Herrick et al.
2019/0188847 A1 6/2019 Gonzalez et al.
2019/0244301 A1 8/2019 Seth et al.
2019/0257661 A1 8/2019 Stentz et al.
2019/0265712 A1 8/2019 Satzoda et al.
2019/0272725 A1 9/2019 Viklund et al.
2019/0286948 A1 9/2019 Sathyanarayana et al.
2019/0303718 A1 10/2019 Tanigawa et al.
2019/0304082 A1 10/2019 Tokashiki et al.
2019/0318419 A1 10/2019 VanderZanden
2019/0318549 A1 10/2019 Zeira et al.
2019/0327590 A1 10/2019 Kubo et al.
2019/0327613 A1 10/2019 Bicket et al.
2019/0370581 A1 12/2019 Cordell et al.
2020/0018612 A1 1/2020 Wolcott
2020/0026282 A1 1/2020 Choe et al.
2020/0050182 A1 2/2020 Cheng et al.
2020/0074326 A1 3/2020 Balakrishnan et al.
2020/0074397 A1 3/2020 Burda et al.
2020/0139847 A1 5/2020 Baumer et al.
2020/0150739 A1 5/2020 Tuan et al.
2020/0162489 A1 5/2020 Bar-Nahum et al.
2020/0164509 A1 5/2020 Shults et al.
2020/0168094 A1 5/2020 Shimodaira et al.
2020/0283003 A1 9/2020 Raichelgauz
2020/0311602 A1 10/2020 Hawley et al.
2020/0312155 A1 10/2020 Kelkar et al.
2020/0327009 A1 10/2020 Callison et al.
2020/0327369 A1 10/2020 Cruz et al.
2020/0342230 A1 10/2020 Tsai et al.
2020/0342235 A1 10/2020 Tsai et al.
2020/0342274 A1 10/2020 ElHattab et al.
2020/0342506 A1 10/2020 Levy et al.
2020/0342611 A1 10/2020 ElHattab et al.
2020/0344301 A1 10/2020 ElHattab et al.
2020/0371773 A1 11/2020 Kato et al.
2020/0380806 A1 12/2020 Tabata
2020/0389415 A1 12/2020 Zhao et al.
2021/0006950 A1 1/2021 Hajimiri et al.
2021/0097315 A1 4/2021 Carruthers et al.
2021/0397908 A1 12/2021 ElHattab et al.
2022/0165073 A1 5/2022 Shikii et al.
2022/0289203 A1 9/2022 Makilya et al.
2022/0374737 A1 11/2022 Dhara et al.
2023/0077207 A1 3/2023 Hassan et al.
2023/0153735 A1 5/2023 Dhara et al.
2023/0169420 A1 6/2023 Dhara et al.
2023/0219592 A1 7/2023 Calmer et al.
2023/0281553 A1 9/2023 Singh et al.
2023/0298410 A1 9/2023 Calmer et al.
2024/0003749 A1 1/2024 Lin et al.
2024/0005678 A1 1/2024 Hassan et al.
2024/0013423 A1 1/2024 Zaheer et al.
2024/0031367 A1* 1/2024 Pringle .................... G06N 5/02
2024/0063596 A1 2/2024 Pandlan et al.
2024/0146629 A1 5/2024 Lloyd
2025/0002033 A1 1/2025 Calmer et al.

FOREIGN PATENT DOCUMENTS

EP 1615178 A2 1/2006
GB 2288892 A 11/1995

(56) References Cited

FOREIGN PATENT DOCUMENTS

| | | | |
|---|---|---|---|
| WO | WO 2017/123665 | A1 | 7/2017 |
| WO | WO 2018/131322 | A1 | 7/2018 |
| WO | WO 2019/099409 | A1 | 5/2019 |
| WO | WO 2019/125545 | A1 | 6/2019 |
| WO | WO 2019/133533 | A1 | 7/2019 |
| WO | WO 2023/244513 | A1 | 12/2023 |

OTHER PUBLICATIONS

"Connect your operations on the Samsara Platform.", Samsara Inc., [publication date unknown]. URL: https://www.samsara.com/products/platform/?gad_source=1&gclid=EAlalQobChMl14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_ 1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

(56) References Cited

OTHER PUBLICATIONS

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.
Brown, P. et al., "AI Dash Cam Benchmarking" [report], Strategy Analytics, Inc., Apr. 15, 2022, in 27 pages.
Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.
Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.
Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.
Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Khan, M., "Why and how we Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.
Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unknown], in 7 pages. URL: https://helpcenter.

(56) References Cited

OTHER PUBLICATIONS gomotive.com/hc/en-us/articles/6162075219229-How-to-recall-request-video-from-the-Motive-Dashcam.
Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.
Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.
Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.
Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.
Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.
Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.
Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.
Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.
Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.
Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.
Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.
Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.
Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.
Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.
Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.
Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.
Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.
Motive Help Center, "What is DRIVE Risk Score?", Motive Technologies, Inc., accessed on Oct. 24, 2023 [publication date unknown],

(56) References Cited

OTHER PUBLICATIONS in 5 pages. URL: https://helpcenter.gomotive.com/hc/en-us/articles/6162164321693-What-is-DRIVE-risk-score-.
Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.
Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.
Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.
Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.
Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.
Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.
Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.
Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.
Motive, "Asset Gateway Installation Guide | Cable/Vehicle Powered" [video], YouTube, Jun. 25, 2020, screenshot in 1 page. URL: https://www.youtube.com/watch?v=pME-VMauQgY.
Motive, "Asset Gateway Installation Guide | Solar Powered" [video], YouTube, Jun. 25, 2020, screenshot in 1 page. URL: https://www.youtube.com/watch?v=jifKM3GT6Bs.
Motive, "Benchmarking AI Accuracy for Driver Safety" [video], YouTube, Apr. 21, 2022, screenshot in 1 page. URL: https://www.youtube.com/watch?v=brRt2h0J80E.
Motive, "CEO Shoaib Makani's email to Motive employees.", Motive Technologies, Inc., Dec. 7, 2022, in 5 pages. URL: https://gomotive.com/blog/shoaib-makanis-message-to-employees/.
Motive, "Coach your drivers using the Motive Safety Hub." [video], YouTube, Mar. 27, 2023, screenshot in 1 page. URL: https://www.youtube.com/watch?v=VeErPXF30js.
Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.
Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.
Motive, "Guide: AI Model Development", Motive Technologies, Inc., accessed on Mar. 29, 2024 [publication date unknown], Document No. 2022Q1_849898994, in 14 pages.
Motive, "Guide: DRIVE risk score", Motive Technologies, Inc., accessed on Apr. 8, 2023 [publication date unknown], Document No. 2022Q2_849898994, in 22 pages.
Motive, "Guide: Smart Event Thresholds", Motive Technologies, Inc., accessed on Apr. 8, 2023 [publication date unknown], Document No. 2022Q1_902914404, in 11 pages.
Motive, "How to install a Motive Vehicle Gateway in light-duty vehicles." [video], YouTube, Aug. 5, 2022, screenshot in 1 page. URL: https://www.youtube.com/watch?v=WnclRs_cFw0.
Motive, "How to install your Motive AI Dashcam." [video], YouTube, Aug. 5, 2022, screenshot in 1 page. URL: https://www.youtube.com/watch?v=3JNG2h3KnU4.
Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.
Motive, "Improve road and fleet safety with driver scores.", Motive Technologies, Inc., Feb. 7, 2019, in 5 pages. URL: https://gomotive.com/blog/improve-fleet-safety-driver-scores/.
Motive, "Industry-leading fleet management solutions", Motive Technologies, Inc., accessed on Feb. 18, 2024 [publication date unknown], in 13 pages. URL: https://gomotive.com/products/.
Motive, "Introducing an easier way to manage unidentified trips.", Motive Technologies, Inc., Apr. 30, 2020, in 5 pages. URL: https://gomotive.com/blog/introducing-easier-ude-management/.
Motive, "Introducing Motive Driver Workflow.", Motive Technologies, Inc., Oct. 16, 2017, in 5 pages. URL: https://gomotive.com/blog/motive-driver-workflow/.
Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.
Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, "KeepTruckin ELD Training for Drivers" [video], YouTube, Feb. 2, 2018, screenshot in 1 page. URL: https://www.youtube.com/watch?v=LKJLIT2bGS0.
Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

(56) References Cited

OTHER PUBLICATIONS

Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_ 1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6I.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUlmBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://

(56) References Cited

OTHER PUBLICATIONS kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-US/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video- Based Safety Systems, Devices, and Components thereof, Investigation No. 337-TA-3722), in 8 pages.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"eco:Drive™ Social, the community of responsible drivers", Stellantis, Apr. 15, 2014, in 2 pages. URL: https://www.media.stellantis.com/em-en/flat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Flat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco:Drive system", Fleet World, 2010, in 3 pages. URL: https://fleetworld.co.uk/fiat-launches-fleet-specific-ecodrive-system/.
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
Goodwin, A., "Fiats ecoDrive teaches efficient driving", CNET, Oct. 22, 2008, In 5 pages. URL: https://www.cnet.com/roadshow/news/fiats-ecodrive-teaches-efficient-driving/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group—Improved driver behavior contributes to a 3+% MPG improvement in less than 12 months", FuelOpps by Propel IT, [publication date unknown], in 2 pages.
"FuelOpps™ Version 2.0" [presentation], Propel IT, Inc., [publication date unknown], in 17 pages.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

(56) References Cited

OTHER PUBLICATIONS

"NetraDyne, an Artificial Intelligence Leader, Launches Driver-ITM, a Vision-Based Platform, Focusing on Commercial Vehicle Driver Safety", Netradyne, [publication date unknown], in 2 pages.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page. (PROPEL-IT-1393_00019).
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"The 2012 Fiat 500: eco:Drive", Flat500USA.com, Feb. 14, 2011, in 24 pages. URL: http://www.fiat500usa.com/2011/02/2012-fiat-500-ecodrive.html.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto is Using AI & MI to Build a Data Platform That Makes Driving Safer and Fleets Smarter" [video], YouTube, Apr. 16, 2018, screenshot in 1 page. URL: https://www.youtube.com/watch?v=UtMirYTmCMU.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
AutoMotoTV, "Flat ecoDrive System" [video], YouTube, Oct. 6, 2008, screenshot in 1 page URL: https://www.youtube.com/watch?v=AUSb2dBBI8E.
Batchelor, B. et al., "Vision Systems on the Internet", Proc. SPIE 6000, Two- and Three-Dimensional Methods for Inspection and Metrology III, Nov. 2005, vol. 600003, In 15 pages.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman @ Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf [uploaded in 2 parts].
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.
Chauhan, V. et al., "A Comparative Study of Machine Vision Based Methods for Fault Detection in an Automated Assembly Machine", Procedia Manufacturing, 2015, vol. 1, pp. 416-428.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.
Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.
D'Agostino, C. et al., "Learning-Based Driving Events Recognition and its Application to Digital Roads", IEEE Transactions on Intelligent Transportation Systems, Aug. 2015, vol. 16(4), pp. 2155-2166.
Dillon, A., "User Interface Design", MacMillan Encyclopedia of Cognitive Science, 2003, vol. 4, London: MacMillan, In 18 pages (pp. 453-458). Downloaded from http://hdl.handle.net/10150/105299.
Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.
Dunn, B., "What is the Lytx DriveCam?", Autobytel, Jul. 12, 2014, in 1 page. URL: https://www.autobytel.com/what-is-lytx-drivecam.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
FiatFranco, ""Ciao!"—Fiat ecoDrive" [video], YouTube, Sep. 10, 2007, screenshot in 1 page URL: https://www.youtube.com/watch?v=SluE9Zco55c.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

(56) References Cited

OTHER PUBLICATIONS

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Gallagher, J., "KeepTruckin's AI Focus driving down costs for customers", FreightWaves, Dec. 9, 2019, in 4 pages. URL: https://www.freightwaves.com/news/al-focus-vaults-keeptruckin-higher-on-freighttech-25-list.
Gilman, E. et al., "Personalised assistance for fuel-efficient driving", Transportation Research Part C, Mar. 2015, pp. 681-705.
Ginevra2008, "Fiat EcoDrive" [video], YouTube, Mar. 7, 2008, screenshot in 1 page. URL: https://www.youtube.com/watch?v=D95p9Bljr90.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Groover, M. P., Automation, Production Systems, and Computer-Integrated Manufacturing, 2015, 4th Edition, Pearson, in 811 pages.
Groover, M. P., *Automation, Production Systems, and Computer-Integrated Manufacturing*, 2016, 4th Edition (Indian Subcontinent Adaptation), Pearson, in 11 pages.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Han, Z. et al., "Design of Intelligent Road Recognition and Warning System for Vehicles Based on Binocular Vision", IEEE Access, Oct. 2018, vol. 6, pp. 62880-62889.
Haworth, N. et al., "The Relationship between Fuel Economy and Safety Outcomes", Monash University, Accident Research Centre, Dec. 2001, Report No. 188, in 67 pages.
Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huang, K.-Y. et al., "A Novel Machine Vision System for the Inspection of Micro-Spray Nozzle", Sensors, Jun. 2015, vol. 15(7), pp. 15326-15338.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS ONE, Apr. 2017, vol. 12(4): e0174959, in 16 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lotan, T. et al., "In-Vehicle Data Recorder for Evaluation of Driving Behavior and Safety", Transportation Research Record Journal of the Transportation Research Board, Jan. 2006, in 15 pages.
Lytx, "TeenSafe Driver Program", American Family Insurance®, 2014, in 10 pages. URL: https://online-sd02.drivecam.com/Downloads/TSD_WebsiteGuide.pdf.
Malamas, Ellas N. et al. "A survey on industrial vision systems, applications and tools", Image and Vision Computing, Dec. 28, 2002, vol. 21, pp. 171-188.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Multivu.com, "Powerful Technology ER-SV2 Event Recorder", Lytx Inc., 2015, in 2 pages, URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_IX7a6j2-E.
Nauto, "The New World of Fleet Safety—Event Keynote" [video], YouTube, Jul. 9, 2020, screenshot in 1 page. URL: https://www.youtube.com/watch?v=IMOab9Ow_CY.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver•j™ Catches no Stop ad Stop Sign | Fleet Management Technology" [video], You Tube, Oct. 3, 2017, screenshot in 1 page. URL: https://www.youtube.com/watch?v=I8sX3X02aJo.
Netradyne, "Driver•j™ Flags Commercial Driver Running Red Light—360-degree vi" [video], YouTube, Oct. 3, 2017, screenshot in 1 page. URL: https://www.youtube.com/watch?v=au9_ZNGYCmY.
Netradyne, Driver Card 1, 2018, In 2 pages (ND_ITC_0001-ND_ITC_0002).
Netradyne, Driver Card 2, 2018, in 2 pages (ND_ITC_0003-ND_ITC_0004).
Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).
Ohidan, A., "Flat and AKQA Launch Eco:Drive ™", Science 2.0, Oct. 7, 2008, in 4 pages. URL: https://www.science20.com/newswire/flat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B—Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages. [uploaded in 3 parts].
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

(56) References Cited

OTHER PUBLICATIONS

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Soumik Ukil, "LightMetrics ADAS demo" [video], YouTube, Jul. 20, 2017, screenshot in 1 page. URL; https://www.youtube.com/watch?app=desktop&v=9LGz1oo7dTw.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. "Over 20 years later, Lytx continues to evolve alongside the industry it serves", FreightWaves, Apr. 16, 2019, in 4 pages. URL: https://www.freightwaves.com/news/technololgy/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage ", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 Biggest Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozSOE.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.

* cited by examiner

710

Virtual Assistant System (VAS): You are a helpful chat bot. Conversation so far:

user: What's the size of my fleet?

720

722

VAS: Classify the last user message as one of the following:

Live data lookup: Fetch data about the customer including vehicles, assets, gateways, reports, cameras, etc.

Device Configuration: Help with setting up or configuring a device, gateway, or other product.

Troubleshooting Assistance: Help with diagnosing and resolving issues with a device, gateway, or other product.

Knowledge Base: Help with finding information in the knowledge base.

Feature Request Submission: Request for a new feature or enhancement to an existing feature.

Billing Inquiry: Help with billing, including questions about invoices, payments, and subscriptions.

Account Management: Manage user accounts, including adding or removing users, changing permissions, etc.

Dashboard Control: Perform controls on the dashboard such as navigating the map or selecting an asset.

Routing Assistance: Vehicle routing questions.

Contact Support: Get in contact with a representative.

Feedback Submission: Provide feedback on a Samsara product or service.

Other Inquiries: None of the above.

Ambiguous User Inquiry: Unsure what is the user intent. Ask for clarification.

You should respond with at least one of these available options: Live data lookup Device Configuration Troubleshooting Assistance Knowledge Base Feature Request Submission Billing Inquiry Account Management Dashboard Control Routing Assistance Contact Support Feedback Submission Other Inquiries Ambiguous User Inquiry

FIG. 7

Virtual Assistant System (VAS): You are a helpful chat bot. Answer customer questions.

Use markdown in answers.

Encode complex function arguments as JSON.

Facts:

- The user is located in San Francisco, CA.

- If no state is given for a city, assume it's the one close to the user in San Francisco, CA.

- When displaying information about a vehicle, show its name (e.g. GSDX-XXX-XXX), and link to the Cloud Dashboard like this: https://cloud.myfleetdashboard.com/o/36211/devices//vehicle - where 36211 is the numeric vehicle ID.

- Always show the reporter for maintenance issues.

user: What's the size of my fleet?

VAS: API: listDrivers();

910

VAS:Given the result in python:

~~~
```python

result = [{"carrierSettings": {"carrierName": "", "dotNumber": 0, "homeTerminalAddress": "", "homeTerminalName": "", "mainOfficeAddress": ""}, "createdAtTime": "2024-02-01T22:14:42.924986Z", "driverActivationStatus": "active", "eldSettings": {"rulesets": [{"break": "Property (off-duty/sleeper)", "cycle": "USA 70 hour / 8 day", "restart": "34-hour Restart", "shift": "US Interstate Property"}]}, "id": "50972993", "licenseState": "CA", "name": "Crash Prone Driver", "staticAssignedVehicle": {"id": "154924973780276", "name": "G8FH-C5J-E6X"}, "timezone": "America/Los_Angeles", "updatedAtTime": "2024-02-01T22:15:54.763945Z", "username": "crashpronedriver"}]


processed_result = process_data(result=result)
```
~~~

920 user:Use the python() function to define the process_data function, which performs any necessary computation or prints results in the desired format. Define only that function and write no other python code.

~~~
```python
~~~

FIG. 9

ARTIFICIAL INTELLIGENCE APPLICATION ASSISTANT

TECHNICAL FIELD

Embodiments of the present disclosure relate to devices, systems, and methods that employ customized artificial intelligence to assist a user of a software application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software applications, such as those that are used for business applications, can display a variety of information. Often the amount of information available to a user, particularly those using a mobile device, such as a smart phone or tablet, may be overwhelming when displayed on the user device. Additional information that is available and actions that are possible with reference to the displayed information may not be known to the user. Thus, systems and methods for improving user interactions with software applications is needed.

SUMMARY

The systems, methods, and devices described herein each have several aspects, no single one of which is solely responsible for its desirable attributes. Without limiting the scope of this disclosure, several non-limiting features will now be described briefly.

In some aspects, the techniques described herein relate to a method performed by an application assistant computing system, the method including: receiving, from a user device, a user input indicating a query or task, determining one or more components associated with a user interface displayed on the user device; access component metadata of the determined one or more components, the component metadata for each of the one or more components indicating one or more of a fact, a data link, or an action; access context information associated with the user or user device; generating a prompt including at least some of the component metadata, at least some of the context information, and an indication of one or more available response elements, the response elements including one or more of agent calls, data link queries, actions, or response text; providing the prompt to a large language model (LLM); receiving an output from the LLM indicating one or more response elements selected by the LLM; processing the one or more response elements; based at least on the processing of the one or more response elements, generating a response indicating one or more updates to the user interface displayed on the user device; and providing the response to the user device so that the one or more updates to the user interface are implemented.

In some aspects, the techniques described herein relate to a method, wherein a first response element includes a data link query of an external data source.

In some aspects, the techniques described herein relate to a method, wherein the output from the LLM includes a properly formatted query for the particular external data source.

In some aspects, the techniques described herein relate to a method, further including: transmitting the properly formatted query to the external data source; receiving a data source output responsive to the query; and including at least a portion of the data source output in the updates to the user interface or in a subsequent prompt to the LLM.

In some aspects, the techniques described herein relate to a method, in response to determining that a size of the data source output is larger than a threshold size, generating and transmitting a processing prompt to the LLM requesting executable code configured to summarize or shorten the data source output.

In some aspects, the techniques described herein relate to a method, wherein the components include one or more of: a navigation component, a notification component, a search component, a data item component, a visualization component, or a general component.

In some aspects, the techniques described herein relate to a method, wherein the context information indicates a user-selected component of the user interface.

In some aspects, the techniques described herein relate to a method, wherein the user-selected component is selected by the user selecting a chat button associated with the particular component.

In some aspects, the techniques described herein relate to a method, wherein the user-selected component is selected in response to the user hovering over the particular component.

In some aspects, the techniques described herein relate to a method, wherein at least some of the component metadata is included in metadata associated with the user interface.

In some aspects, the techniques described herein relate to a method, wherein the component metadata is transmitted from the user device to the application assistant computing system.

In some aspects, the techniques described herein relate to a method, wherein at least some of the component metadata is looked up by the application assistant computing system based on the determined one or more components.

In some aspects, the techniques described herein relate to a method, wherein a fact includes one or more of information displayed in the user interface, information selected in the user interface, metadata associated with a visualization displayed in the user interface, a user identifier, a user role, or other user information.

In some aspects, the techniques described herein relate to a method, wherein the metadata associated with a visualization displayed in the user interface includes one or more of an area included in a map, address or coordinates of a center of the map, or statistics regarding items shown on the map.

In some aspects, the techniques described herein relate to a method, wherein a data link is usable to access a source of information displayed in the user interface.

In some aspects, the techniques described herein relate to a method, wherein an action indicates a user-initiated event including one or more of: initiating a search, initiating a sort, navigating to a different page, filling a form, submitting a form, moving data, or modifying data.

In some aspects, the techniques described herein relate to a method, wherein the one or more updates includes providing a textual response to the query or task.

In some aspects, the techniques described herein relate to a method, wherein the one or more updates includes updating a visualization of the user interface.

In some aspects, the techniques described herein relate to a method, wherein the visualization includes a map, chart, graph, table, or image.

In some aspects, the techniques described herein relate to a method, wherein output from the LLM includes a template indicating the one or more response elements, wherein the template is selected based on one or more of the user input or the component metadata.

In some aspects, the techniques described herein relate to a method, wherein the template indicates one or more of a well-tested prompt, optimized context data, and careful guard rails.

In some aspects, the techniques described herein relate to a method, wherein the prompt includes a contextual hint associated with a data access link, wherein the contextual hint indicates one or more of a required format, criteria to identify incorrect data, or examples of data that is acceptable.

In some aspects, the techniques described herein relate to a method, wherein the user input is text or voice.

In some aspects, the techniques described herein relate to a method, wherein the user input is initiated based on selection of a chat button or pressing a physical button on the user device.

In some aspects, the techniques described herein relate to a method, wherein one or more facts includes domain-specific knowledge usable by the LLM to better response to the user input.

In some aspects, the techniques described herein relate to a method, wherein one or more facts are determined by a planning module or tools of the computing system.

In some aspects, the techniques described herein relate to a method, wherein a first of the one or more facts is associated with the planning module and is configured to guide the LLM to generate executable code for analysis of large data responses.

In some aspects, the techniques described herein relate to a method, wherein a first of the one or more facts is associated with the tools and is configured to guide the LLM in processing responses from a tool call indicated by the tools.

In some aspects, the techniques described herein relate to a method, wherein the component metadata for each of the one or more components indicating one or more of a fact, a data link, or an action.

In some aspects, the techniques described herein relate to a method, wherein the response elements include one or more of agent calls, data link queries, actions, or response text.

Various embodiments of the present disclosure provide improvements to various technologies and technological fields, and practical applications of various technological features and advancements. Various embodiments of the present disclosure provide significant improvements over such technology, and practical applications of such improvements. Additionally, various embodiments of the present disclosure are inextricably tied to, and provide practical applications of, computer technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 7 is an example index prompt to the LLM.

FIG. 9 is another example prompt.

DETAILED DESCRIPTION

Figure 1:
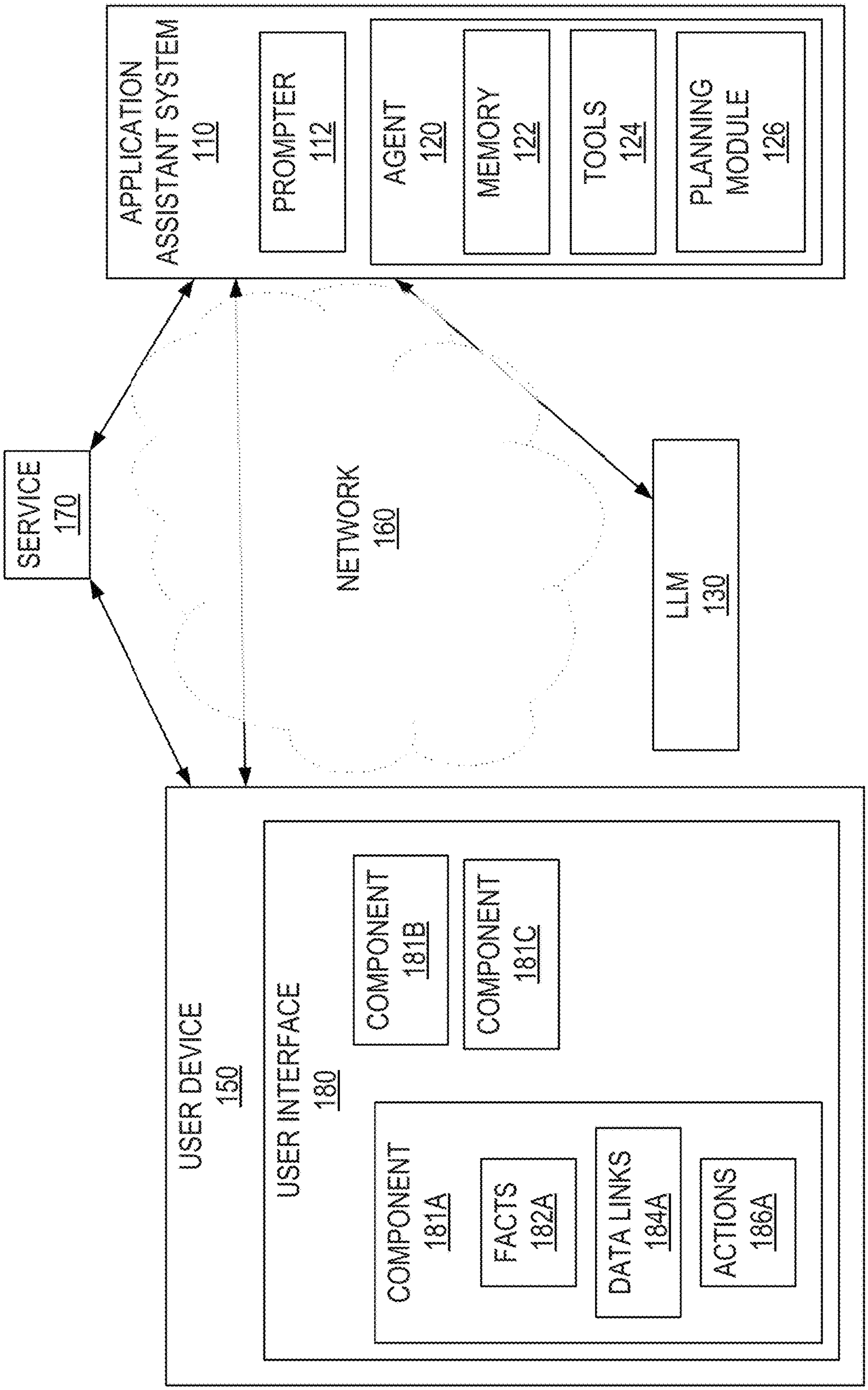
FIG. 1 is a block diagram illustrating one example of components and communications between a user device and various components of a AAS.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The following description includes discussion of various processes and components that may perform artificial intelligence ("AI") processing or functionality. AI generally refers to the field of creating computer systems that can perform tasks that typically require human intelligence. This includes understanding natural language, recognizing objects in images, making decisions, and solving complex problems. AI systems can be built using various techniques, like neural networks, rule-based systems, or decision trees, for example. Neural networks learn from vast amounts of data and can improve their performance over time. Neural networks may be particularly effective in tasks that involve pattern recognition, such as image recognition, speech recognition, or Natural Language Processing.

Natural Language Processing (NLP) is an area of artificial intelligence (AI) that focuses on teaching computers to understand, interpret, and generate human language. By combining techniques from computer science, machine learning, and/or linguistics, NLP allows for more intuitive and user-friendly communication with computers. NLP may perform a variety of functions, such as sentiment analysis, which determines the emotional tone of text; machine translation, which automatically translates text from one language or format to another; entity recognition, which identifies and categorizes things like people, organizations, or locations within text; text summarization, which creates a summary of a piece of text; speech recognition, which converts spoken language into written text; question-answering, which provides accurate and relevant answers to user queries, and/or other related functions. Natural Language Understanding (NLU), as used herein, is a type of NLP that focuses on the comprehension aspect of human language. NLU may attempt to better understand the meaning and context of the text, including idioms, metaphors, and other linguistic nuances.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant, aiding in understanding, generating, and manipulating language. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model (LLM) distinguishes itself from regular language models by its extensive training on a much larger data set and a significantly higher number of training parameters. This advanced training enables an LLM 130 to discern complex patterns and produce text that is both coherent and contextually accurate, making it adept at handling a broad spectrum of topics and tasks. An LLM 130 operates by processing input text and iteratively predicting subsequent words or tokens, which could be parts of words, word combinations, punctuation, or their mixtures. LLMs come in various forms, including Question Answer (QA) LLMs optimized for context-based answer generation, multimodal LLMs, among others. In an example implementation discussed in further detail herein, an LLM may be configured (e.g., by instructions included in a prompt from a requesting device) to determine user intent, determine missing information needed to resolve the user request, retrieve the missing information from one or more knowledge bases (e.g., using tools), and combine information from the context and tool calls (e.g., to knowledge bases) into an answer/response to the requesting device.

An LLM, as well as other models discussed in this disclosure, may incorporate neural networks (NNs) trained through self-supervised or semi-supervised learning, including feedforward or recurrent NNs. They may also feature attention-based or transformer architectures. Particularly useful in natural language processing, LLMs excel at interpreting natural language prompts and generating natural language responses based on their training data. However, they typically lack awareness of data security or data permissions, as they do not retain permissions information from their training text, which may limit their response scope in permissions-sensitive contexts.

While this specification primarily focuses on LLMs and AI models, the mentioned aspects and implementations can be applied using other types of models like other generative AI models, machine learning (ML) models, multimodal models, or other algorithmic processes.

In different implementations, the LLMs and other models (including ML models) described herein can be hosted locally, managed in the cloud, or accessed through Application Programming Interfaces (APIs). They can also be implemented using electronic hardware such as a graphics processing unit (GPU), or application-specific processors, for example, Application-Specific Integrated Circuits (ASICs) or Field Programmable Gate Arrays (FPGAs). The data used by an LLM, such as in model inputs, outputs, training data, or modeled data, can encompass a wide array, including text, files, documents, emails, images, audio, video, databases, metadata, geospatial data, web data, and sensor data, among others.

FIG. 1 is a block diagram illustrating one example of components and communications between a user device 150 and various components of an Application Assistant System (AAS 110). In this example, in this example, the AAS 110 (which may also be referred to as a Prompter Computing System) is configured to communicate with an LLM 130 to provide information relevant to components of a current user interface that is displayed on a user device 150. In other embodiments, the functionality of certain components of the AAS 110, the user device 150, or other devices discussed herein, may be performed by other components and/or may be combined or separated for performance by other components.

In the example of FIG. 1, the various devices are in communication via a network 160, which may include any combination of networks, such as a local area network (LAN), personal area network (PAN), wide area network (WAN), the Internet, and/or any other communication network. Communications between devices may be wireless and/or wired, such as via any existing communication protocols. Modules of the illustrated components, such as prompter 112 and agent 120 of the AAS 110, may communicate via an internal bus of the AAS 110 and/or via the network 160.

In this example, the user device 150 (which may refer to a computing device of any type that is operated by human user) displays a user interface 180 on a display of the user device. For example, the user device 150 may be a smartphone, tablet, desktop computer, laptop, smartwatch, e-reader, gaming console, virtual/mixed/augmented reality device, smart glasses, personal digital assistant, and/or other similar device. The user interface 180 may be provided by a website (e.g., via a browser or similar application) or standalone application.

As one example, the user interface 180 may be provided by a site management application may include information regarding a site (e.g., a worksite) that the user wishes to monitor, such as information regarding equipment at the site, workers at the site, security at the site, etc. As another example, the user interface 180 may be a fleet management user interface that is viewed by a fleet supervisor or fleet dispatcher, which may include information such as vehicle location and tracking, maintenance schedules, fuel usage and efficiency, driver behavior and performance, accident or incident information, inventory management, and the like. One example implementation of a fleet management application may provide some or all of:

- Real-Time Fleet Monitoring: Precise, specific, and real-time data on assets, vehicles, and drivers to enable monitoring and quick response to any on-road situation.
- Data Analysis and Reporting: Ad-hoc insights into real-time and historical data on fleet performance, driver behavior, and operational efficiency.
- Compliance Management: Assistance in managing compliance, using data on hours of service ("HOS"), driver vehicle inspection reports (DVIRs), and a knowledge base to conduct analysis and offer precise feedback on compliance situations, requirements, and opportunities.
- Basic Route Changes: Allows evaluation and modification of routes for vehicles. This may include calculating the best paths based on various factors like distance, traffic, weather, and driver HOS.
- Driver Communication: Direct email and text comms from admins to drivers and customers. Users can send route information, updates, instructions, and images, enhancing coordination and reducing the likelihood of errors or delays.

The user interface 180 may include various components 181, such as components 181A, 181B, and 181C. Each of the components may include associated component metadata, illustrated with reference to component 181A, that may include facts 182, data links 24, actions 186, which will each be discussed further herein.

In the example of FIG. 1, the user device 150 interacts with the user interface 180 to provide some indication and/or request for information from a service provider (e.g., a provider of the specific application that is currently being viewed in the user interface 180, such as the example site management or fleet management applications mentioned above). To provide the most relevant information to the user, context information associated with components 181 of the current user interface 180 is provided to the AAS 110. The AAS 110, in turn, communicates with an LLM 130 to determine the most relevant information and/or follow-up questions or remarks, to provide to the user. Thus, the AAS 110 may gather and store context information and store context history for use in subsequent communications with the LLM 130.

In the example of FIG. 1, the AAS 110 includes a prompter 112 that is generally configured to communicate with the LLM 130, one or more agents 120, and one or more services 170. In some embodiments, the prompter 112 is an agent 120, and may include some or all of the components and functionality discussed herein with reference to agent 120. The prompter 112 may generate and send prompts to the LLM 130 and receives responses from the LLM 130, in a series of one or more "turns," or back-and-forth communications between the AAS 110 and the LLM 130. The prompter 112 works in conjunction with one or more agents 120, each comprising a memory 122, tools 124, and a planning module 126. For ease of description, the discussion herein may refer to a single agent 120, but the AAS 110 may include and/or may communicate with multiple agents 120 in a similar manner as discussed herein. Thus, a reference to an agent 120 should be interpreted to also include communications with multiple agents 120.

In general, the memory 122 stores data, information, and knowledge used by the agent 120 to perform tasks or make decisions. For example, memory 122 may store responses from data link or tool calls, such as user or customer data. This may include both short-term memory for temporary storage of variables and long-term memory for storing learned patterns, rules, or historical contexts, for example. The memory 122 can be implemented using various techniques such as databases, hash tables, or neural networks, depending on the specific requirements and constraints of the AAS 110. The tools 124 are generally software components that provide functionalities for the agent 120 to interact with their environment, manipulate data, or perform tasks. The tools 124 may include data processing algorithms, such as algorithms for pattern recognition, natural language processing, or image analysis, or interfaces for interacting with external systems, such as making data requests to a service 170. Tools 124 can be integrated into the agent's memory 122 or operate independently. In some implementations, the tools 124 may include a data access tool 124 configured to access data in one or more proprietary or publicly available data sources. For example, a data access tool 124 may provide access to a knowledge base, e.g., backed by a vector store, that provides information relevant to a user requested task. In the example of a fleet management application, a data access tool may have access to one or more knowledge bases with information regarding compliance situations, requirements, opportunities, etc. The planning module 126 is generally responsible for generating actions or decisions that the agent 120 executes to achieve its goals or solve problems. The planning module 126 may use information from the memory 122, tools 124, and/or external inputs to evaluate different options, predict outcomes, and select the best course of action based on predefined rules, heuristics, or machine learning models, for example. The planning module 126 importantly enables the agent 120 to adapt to changing situations, learn from experience, and make informed decisions in complex environments.

In the context of the example fleet management application, communication between the user device 150 and the AAS 110 may provide various advantages to different potential users of the application, such as, for example:

- Dispatchers: May aid in the real-time tracking and monitoring of vehicles and drivers, facilitating quick, data-driven decision-making and effective communication with the fleet and with customers.
- Fleet Managers: May assist in daily operations, compliance management, and insights that help optimize fleet performance.
- Operations Associates: may provide critical insights into fleet activities, enabling analysis of data for strategic planning and enhanced operational control along with basic Q&A for learning about the fleet management application.

Figure 2:
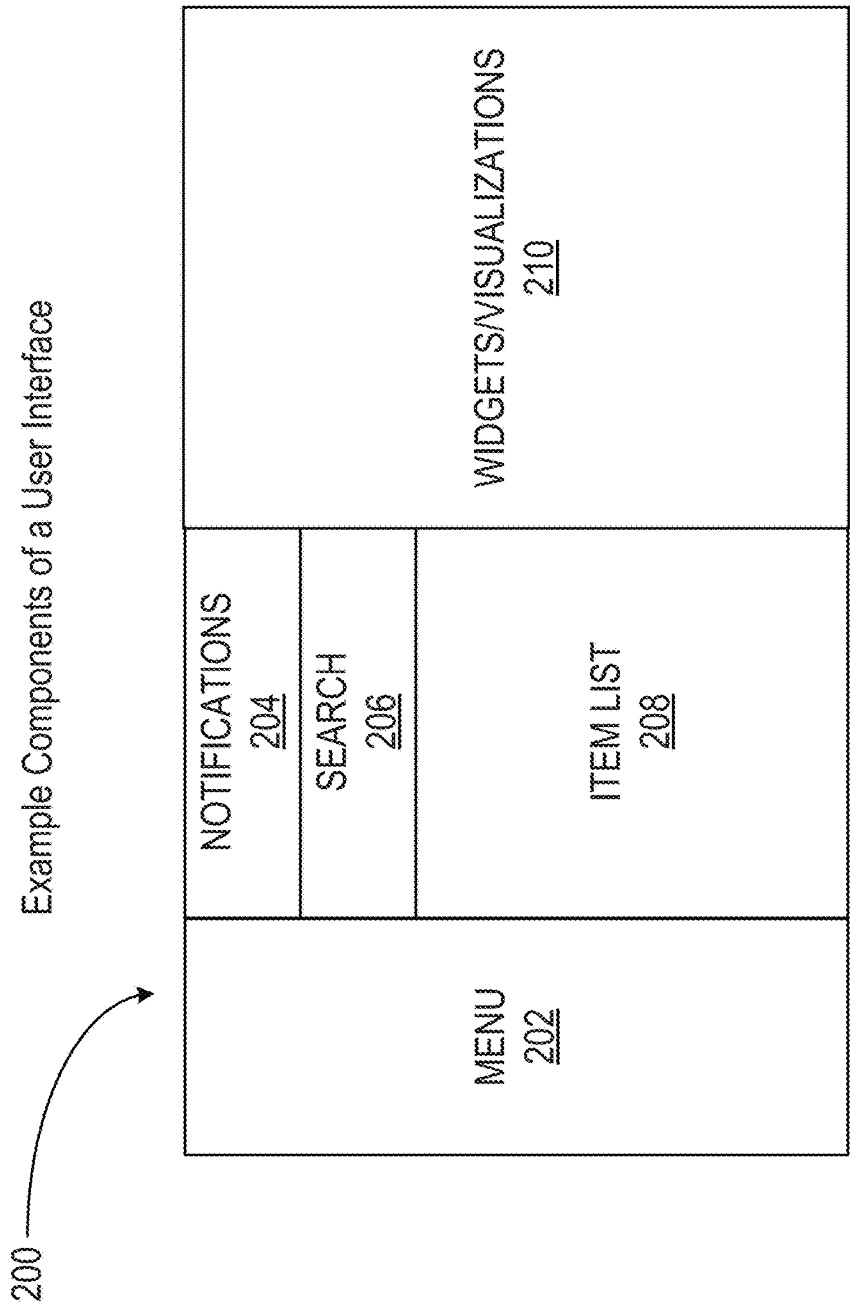
FIG. 2 is a diagram illustrating various components of an example user interface.

FIG. 2 is a diagram illustrating various components of an example user interface 200. The example components 202, 204, 206, 208, 210 illustrated in FIG. 2 are only examples of possible components, layouts, and configurations of those components. Other types of components, quantity of components, configuration of components, etc. may be used in other user interfaces. In this particular example, a notification component 204 may display alerts or updates related to various aspects of the software application or website. For example, notifications can inform the user about new messages, events, changes in settings, or other information that may immediately be relevant to the user. The search component 206 allows the user to find specific content features or functions associated with the application, such as by entering or speaking keywords or phrases related to their query. The menu component 202 may provide a listing of functions available within the application, such as functions to navigate to a particular section of a user interface, update the components of the user interface, create a visualization, and/or any other function associated with the application. The item (or "asset") list component 208 may display a list of items, such as a list of computing devices that are being monitored by a network security application or a list of vehicles in a fleet management application. The widgets/visualizations component 210 may include various graphical representations that help the user understand data, trends, patterns or relationships, such as information associated with the example list of computing devices that may be displayed in the item list component 208. Visualizations may include charts, graphs, diagrams, infographics, maps, animations, and/or any other type of visual displays. Visualizations may be interactive, such as to receive a user input that adjusts the visualization and/or initiates updates to other components, for example.

Each of the components of a user interface, such as the example components 202-210 in FIG. 2, may be associated with component metadata, such as facts, actions, data links, and/or other categories or types of metadata. The component metadata may be included in the user interface code (e.g., as metadata in HTML code associated with the user interface) or may be accessible to the AAS 110, such as in a table or other data structure with associations between user interface components and component metadata. As discussed further herein, this component metadata may be provided to an LLM 130 as context for determining the most relevant information to provide to the user, additional information that may be obtained from an external service, or an action to perform.

Figure 3:
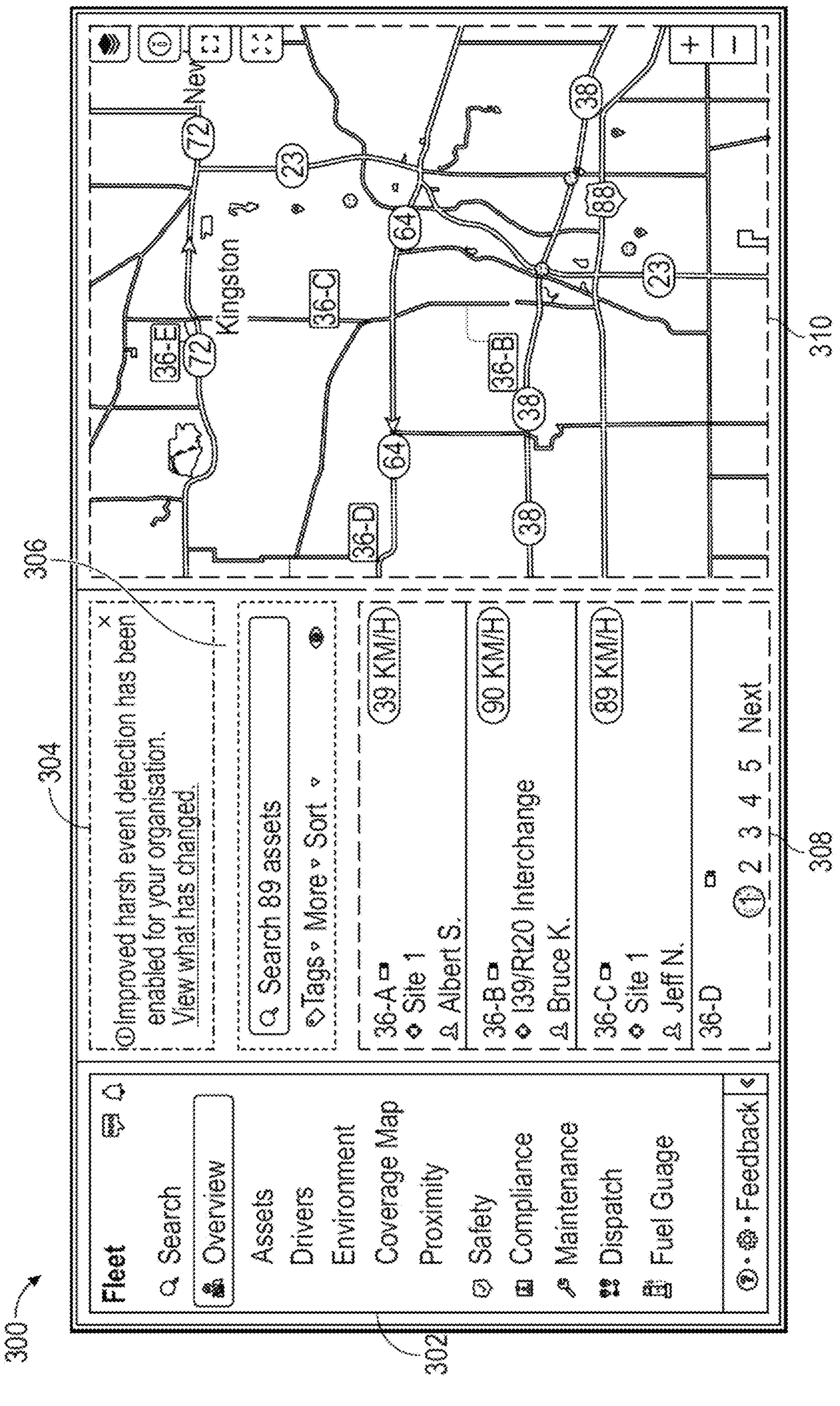
FIG. 3 is an example user interface that may be displayed on a user device.

FIG. 3 is an example user interface that may be displayed on a user device. In this example, the user interface 300 includes information associated with a fleet of vehicles, such as may be used by a manager, supervisor, administrator, dispatcher, etc. of a vehicle fleet. In this example, the components of the user interface 300 correspond generally to the components of the user interface 200 (FIG. 2). As discussed with reference to FIG. 2 also, the types of components, as well as configurations of components, of FIG. 3 are provided as only an example implementation, but in other implementations the quantity, type, arrangement, etc., of components may vary.

In the example of FIG. 3, a menu component 302 includes general options available for display, such as an overview of vehicles (or other assets), drivers, environment, coverage map, proximity, etc. This example menu also includes options to view safety, compliance, maintenance, and dispatch information regarding the fleet of vehicles. The example notifications component 304 includes various notifications regarding the vehicle fleet. The example search component 306 allows a user to enter a search query, which may be limited by associated tags or other categories of information, to narrow results that are displayed in the other user interface components, such as in the asset list component 308. The asset list component 308 indicates information regarding at least some of the assets of the fleet, such as a subset of assets that match a search query provided in the search component 306. The visualization component 310 illustrates a map with the assets displayed at their respective locations on the map.

The table below includes examples of component metadata that might be associated with the particular user interface 300 of FIG. 3. These are provided as examples only and are do not limit the scope of other components or component metadata that may be associated with a user interface.

| Component | Facts | Actions | Data Links |
|---|---|---|---|
| Menu | Logged in as John Smith for TruckALot. User role is "Dispatcher" | Navigate To SearchNavigation | |
| Notification | One new notification: "Improved harsh event detection has been enabled for your organization" | HarshEvent Detection-LearnMore | Notification Archive |
| Search | Available Search Tags are: Drivers, Project1 | Assets-Search Assets-Sort Assets-ShowAll | |
| Asset List | User has 89 assets (5 pages). | Assets-NextPage AssetData | |
| Map | The map shows the area around Sycamore, IL near Chicago, IL around 41.75N, 89.42W. Four assets are in the area within a 20km radius. | Navigate ToLocation Navigate ToAsset SetZoom NavigateDirection Show/HideLayer | MapGISData Routes AssetLocations |
| Overall | The user is on the "fleet overview map" page. The user did not select any text on the page. | | |

In the example table above, the component metadata (categorized as facts, actions, or data links metadata in this example) are associated with the various components of the user interface 300. The component metadata may be usable by the AAS 110 and/or LLM 130 to identify the most relevant and useful information to provide to the user. In this particular example, the Actions (of the component metadata) associated with the Menu component includes:

- NavigateTo: may be used to navigate within the application to a specific page, feature, or section.
- SearchNavigation: may be used to search for specific routes, locations or navigation—related data within the application.

These Actions, when selected by the LLM, may be performed by the AAS 110, without further input from the user, to actively perform a function, process, or task. Skipping to the search component 306, the Facts (of the component metadata) indicate the currently selected search criteria, which may include a text query, as well as filtering based on one or more tags or other criteria. In some embodiments, Facts not only augment information needed at a given stage of the problem solving process, but may also nudge or guide the LLM to perform actions in a certain way to fulfill business needs. For example, if a query results in a large data response, the LLM may be guided via facts to perform code evaluation via python rather than trying to solve the problem in-prompt. Returning to the example above, the user has selected two tags: "Drivers" and "Project 1". Thus, the search to be performed (or that has already been performed) limits the results, e.g., the list of assets, to those associated with those two tags. The actions associated with the search component 306 include example actions:

Assets-Search: may be used to filter assets that are currently associated with the user account and/or user.

Assets-Sort: may be used to sort the listed assets, such as those that match the search criteria, based on a sort criteria selected by the user and/or a default sort criteria.

In this example, component metadata for the Search component does not include any Data Links, but in some implementations may include a link to a database or other service from which information may be provided and/or received. For example, in some implementations the Search component may include a data link to a service 170 (FIG. 1), such as to a network accessible database that the AAS 110 may query, such as using an API, SQL, or other query generated by the LLM 130 specifically for that database, to obtain additional information. In the context of a fleet management application, example of services 170 may include a fleet information data source, vehicle tracking and location data source, user information data source, a geographic map data source, a code generation service, a visualization generation service, and/or any other data service that may be useful in providing information back to the user.

In the example table above, the Asset List component 308 is associated with Facts metadata indicating the quantity of assets currently available for display, as well as an estimated number of pages required for display of the assets. The Actions metadata associated with the asset list component 308 includes actions to show a NextPage of the assets and to ShowAll of the assets. The asset list component 308 is also associated with a data links metadata associated with AssetData, which may indicate a data service, such as a database storing asset information, that may be queried by the AAS 110 in response to instructions from the LLM. For example, the AssetData may be queried to obtain additional information regarding one or more assets that are selected by the user.

In the example table above, the map component 310 includes various Facts indicating general information regarding a map that is displayed in the map component 310, as well as Actions that allow updates to information included in the map, zoom level of the map, hidden layers, etc., and data links to external services that may be accessed to obtain additional information relevant to the map. In this example, the Routes datalink may be associated with a data source storing route information associated with the assets, such as previously travel and/or scheduled routes of each asset or driver. Thus, the LLM 130 may indicate calls to this data source to obtain information regarding routes of assets that may be requested by the user. Similarly, an Assetlocations datal link may be accessed to determine current and/or past locations of any assets.

In the example table above, the Overall component includes Facts metadata that may provide context usable by the LLM 130 to provide the most relevant information to the user. In this example, the Facts metadata indicates a current page that the user is viewing. In some implementations, the Facts metadata may indicate a position of a cursor (e.g., which component or item within a component a cursor is currently hovering over), a previously viewed user interface and/or components, and/or any other information that may be relevant to the LLM. For example, information indicating which component the user has recently and/or is currently interacting with may allow the LLM 130 to provide information associated with that specific component rather than the other components of the current user interface.

Figure 4A:
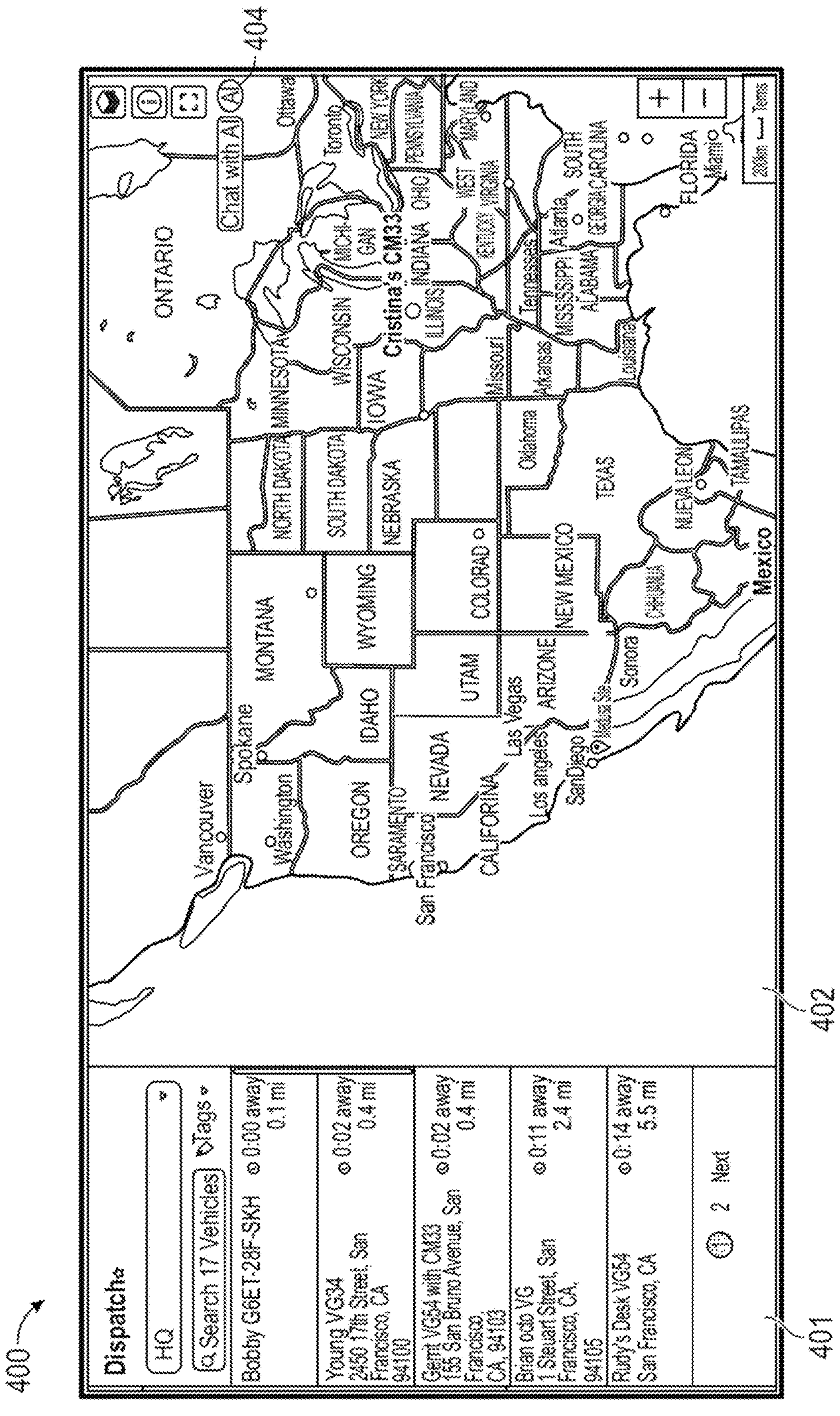
FIGS. 4A-4C are example user interfaces that show various methods by which a request for information from the AAS may be initiated.
Figure 4B:
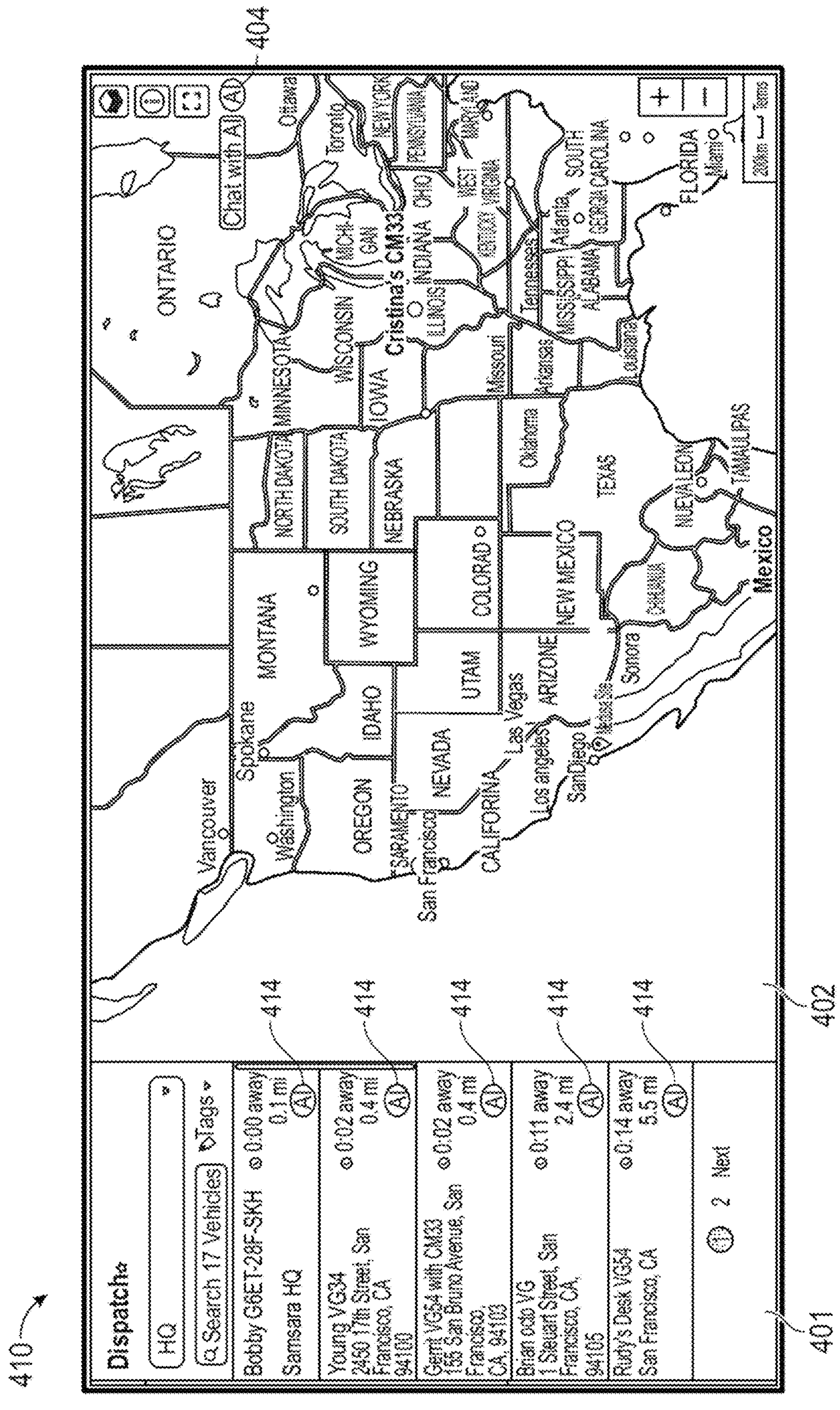
Figure 4C:
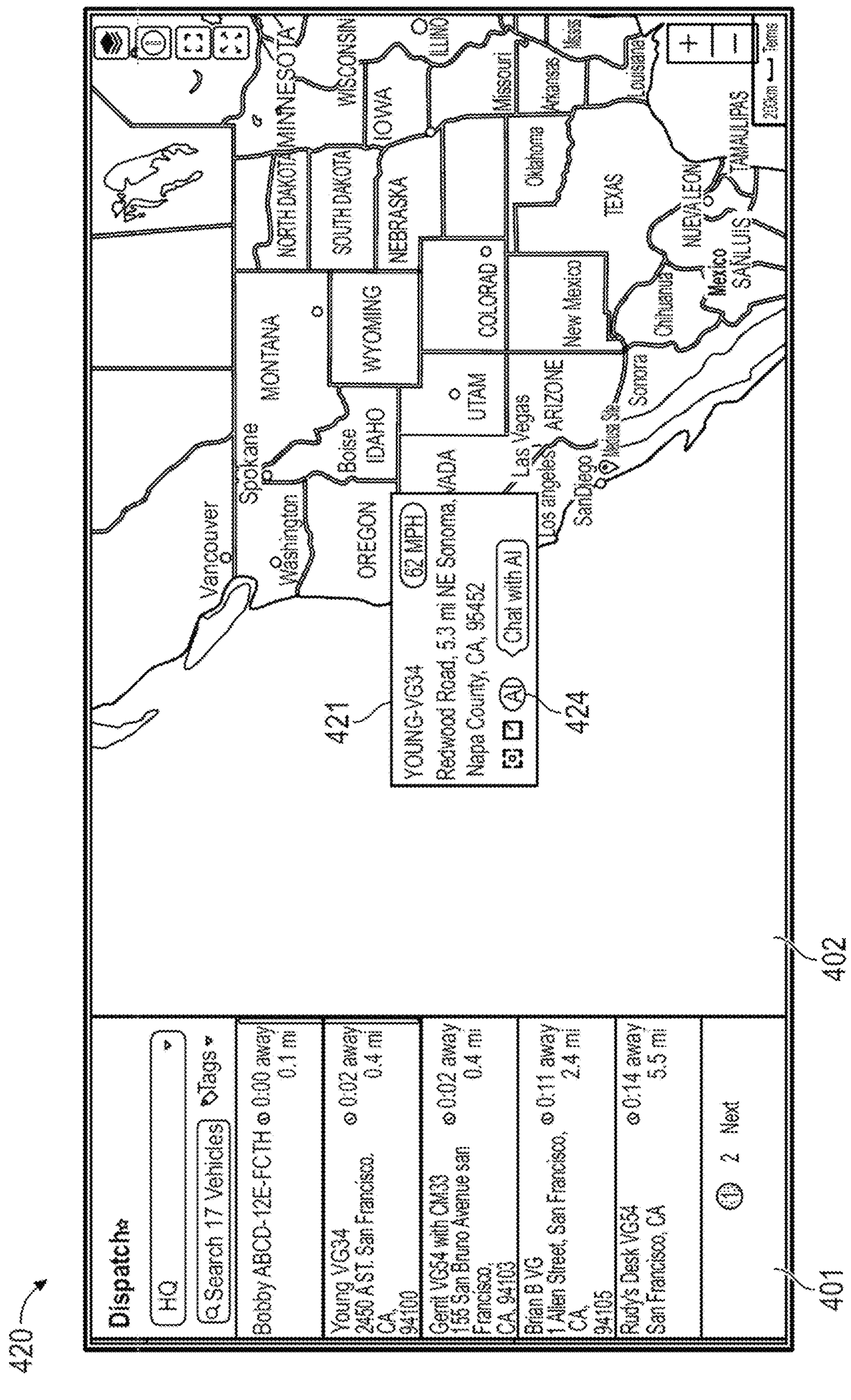

FIGS. 4A-4C are example user interfaces that show various methods by which a request for information from the AAS 110 may be initiated. In these examples, the user selects a "chat with AI" or an "AI" button or icon displayed in the user interfaces 400, 410, 420 to initiate communication with the AAS 110 and LLM 130. In other embodiments, other actions may initiate communication with the AAS 110, such as pressing of a hardware button on a mobile device, providing a voice command, or performing some other action that initiates communication with the AAS 110, such as hovering over a particular user interface component for a set period of time, selecting a certain combination of user interface items, and/or any other combination of user actions that may indicate communication with the AAS 110 would be helpful.

In the example of user interface 400, a map is displayed showing locations of various assets. A chat icon 404 may be selected by the user to initiate communication with the AAS 110. For example, when the chat icon 404 is selected by the user, component metadata associated with the map component 402 and/or asset listing component 401 may be transmitted to the AAS 110 to initiate the communication. In the example of FIG. 4B, the user interface 410 displays similar map and asset data, now with chat icons 414 associated with each of the assets included in the asset listing component 401. In this example, selection of a particular chat icon 414 may allow additional context information to be provided to the AAS 110, such as information regarding the particular asset associated with the selected chat icon 414. In the example of FIG. 4C, the user interface 420 includes a pop-up 421 that may appear in response to the user selecting a particular asset in the asset listing component 401. For example, the pop-up 421 may be positioned near a map location of the selected asset, with additional information regarding the selected asset. In this example, the pop-up 421 also includes a chat icon 424 that may be selected by the user to initiate communication with the AAS 110, such as including additional context information regarding the selected asset that may improve results provided by the LLM 130 by narrowing them to the selected asset.

Figure 5:
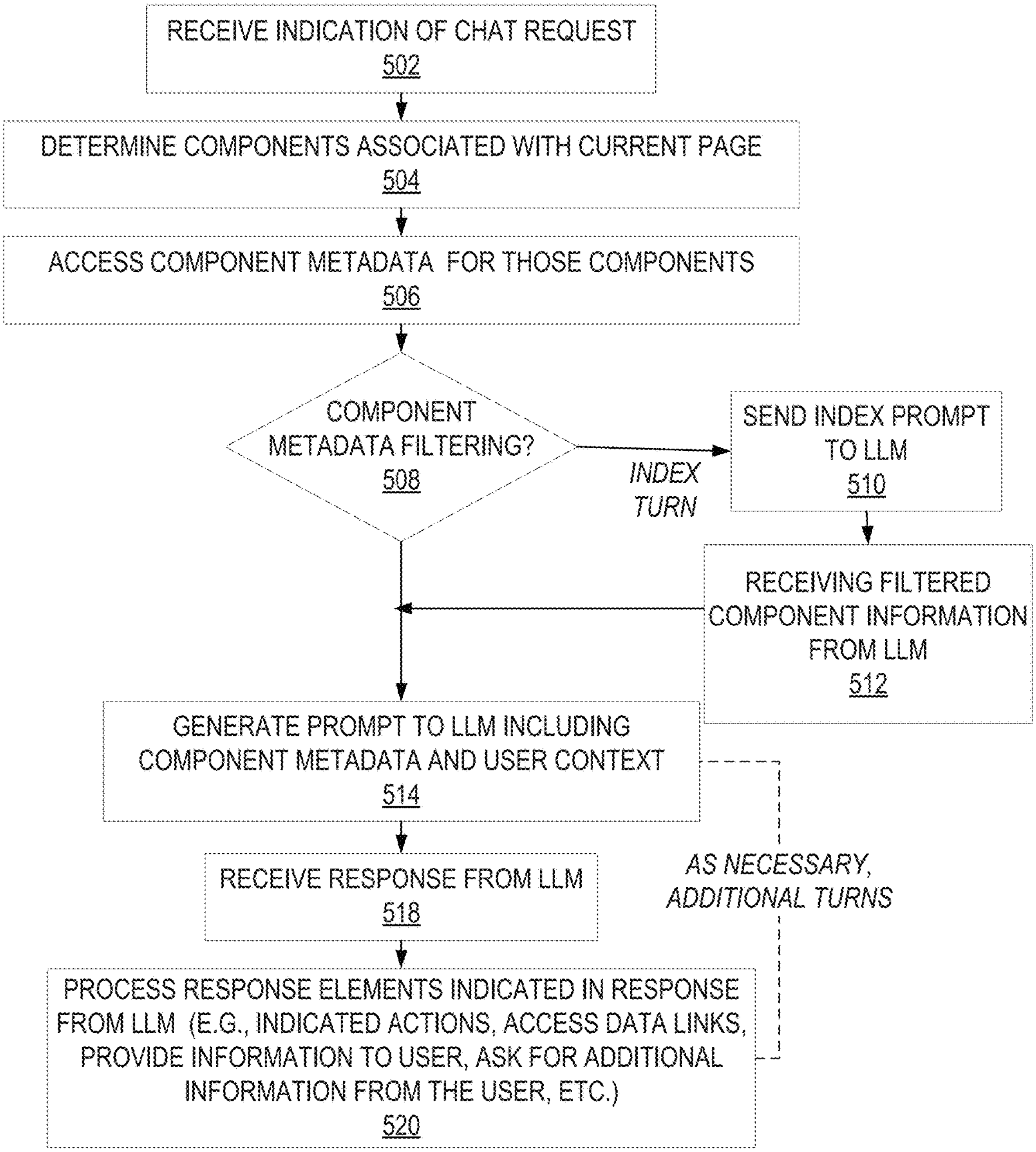
FIG. 5 is a flowchart illustrating one example embodiment of a method that may be performed by a virtual assistant system to provide information to a user that is focused on the current user interface displayed on the user device.

FIG. 5 is a flowchart illustrating one example embodiment of a method that may be performed by an Application Assistant System to provide information to a user that is focused on the current user interface displayed on the user device. Depending on the embodiment, the method of FIG. 5 may include fewer or additional blocks and/or the blocks may be performed in an order different than illustrated.

Beginning at block 502, an indication of a chat request is received by the AAS 110. As noted above, the initiation of communication with AAS 110 may take several forms, such as the user clicking on a button, icon, or other user interface element, associated with initiating communication with the AAS 110, pressing a hardware button on the mobile device, speaking a command, and/or performing any other action that the software provider determines may be indicative of a request and/or a possible need of the user to communicate with the AAS 110. For example, a user may select a button to initiate a chat with an AI, and then provide, via voice or text, a task or query, such as, in the context of an example fleet management application:

Show me all the trucks that have delays?

Show me all the vehicles in Seattle?

Add a safety score field to this form
What do I write into this field?
Can you create a new form with driver safety information?
Which reports are for safety?
Show this report but only for California drivers
Put this in print layout
Show Chicago
Any traffic warnings in this area?
Show routes to Chicago for this truck
Highlight idle trucks on the map
I want that page with my driver's safety events on it. Like seatbelts and stuff.

In some implementations, the information provided by the user to initiate a chat dialog may include multi-modal information, e.g., different types files, such as image, video, or data files. As one example, a user may be able to attach an image and make a request to "attach this image to the report", or ask questions using content from the image, or make requests like uploading a spreadsheet and asking to "turn these into reports."

Next, at block 504, the AAS 110 determines one or more components associated with a current user interface on the user device 150. In some embodiments, the chat request from the user device 150, such as may be triggered as noted above with reference to block 502, may include a current page/user interface displayed on the user device 150 or may include a list of components on that page. The components may be identified using alphanumeric identifiers, for example. In some embodiments, information associated with the particular chat button may be provided to the AAS 110 and/or used to begin a dialog with the LLM. For example, a user interface that shows a maintenance table for a vehicle (or multiple vehicles) may include a "help" button (which is one example of a "chat" button) that initiates a chat session with a query about the particular fault-code pre-filled into the initial information provided to the AAS 110 and LLM 130.

Moving to block 506, the AAS 110 accesses and determines component metadata for the components on the current page. For example, the request from the user device 150 may include the component metadata, such as may be retrieved from a table (or other data structure) included in the code of the software application that provided the user interface. In some embodiments, the AAS 110 looks up the component metadata based on the listing of components received in block 504. In either case, the component metadata may include various types of metadata, such as facts, data links, actions, and/or other information associated with particular components.

At block 508, in some implementations the AAS 110 determines whether an initial request should be sent to the LLM 130, referred to as an index turn, to identify the most relevant components for the requested task or query. For example, if the current page/user interface includes a large quantity of components, corresponding component metadata, and/or other user context information, the AAS 110 may initially ask the LLM 130 to determine which components are most relevant, rather than sending all of the components and/or component metadata to the LLM 130 on an initial prompt.

Thus, at block 508, if the AAS 110 determines that component metadata filtering is advantageous, an initial prompt sent to the LLM 130 may include the user query, and general component information, with a request for the LLM 130 to identify the most relevant component or components. In this situation, the method moves to block 510 where the index prompt is sent to the LLM, and then at block 512 a filtered listing of component information from the LLM 130 is received by the AAS 110. For example, the filtered listing of component information may indicate one or more components that the LLM 130 has identified as most relevant to the user query, such as based on context information that may have also been provided in the initial index prompt. The method may then continue to block 514 where another prompt is generated, this time including component metadata of the components identified by the LLM 130 in response to the index turn.

Similarly, if at block 508 the AAS 110 determines that component metadata filtering is not needed, the component metadata of all of the components, or some subset of the components as may be filtered using logic provided by the AAS 110 or as part of the application on the user device 150, are included in a prompt to the LLM (at block 514). Additionally, the prompt to the LLM 130 may include user context information, such as information regarding the user's role, location, permissions, etc. that may influence processing of the request by the LLM. Additionally, in some implementations the prompt may include available response elements, indicating what types of responses the LLM 130 should return. For example, available response elements may include actions such as an agent call, a database query, or an action that is to be performed by the AAS 110 and/or user device 150. Response elements may include examples of response text that may be returned and passed on to the user device.

In some implementations, prompts may be generated based on a template, such as may be selected by the AAS 110 or indicated by the LLM 130, e.g., in response to an index turn. For example, a template may be selected based on one or more of the user input or the component metadata. A template may indicate one or more of a well-tested prompt, optimized context data, careful guard rails, response elements, and/or other information that is useful in generation of a prompt.

At block 518, a response to the prompt is received from the LLM 130, and at block 520 the response elements included in the response are parsed and processed, such as to determine any indicated actions, requests for data link access, information to provide to the user, additional questions for the user, etc. The process of generating a prompt, receiving a response from the LLM 130, and processing response elements in the response, may be repeated multiple times (or multiple "turns"), such as in response to an indication in a response from the LLM 130. For example, an initial response from the LLM 130 may have a data call request that the AAS 110 performs and then includes results of in a subsequent prompt to the LLM 130. Similarly, the LLM 130 may include software code (e.g., Python code) that is executable by the AAS 110 to access, summarize, filter, and/or otherwise identify and provide a relevant portion of information to the LLM 130 in a subsequent prompt, such as in response to a processing prompt that requests such executable code.

Figure 6:
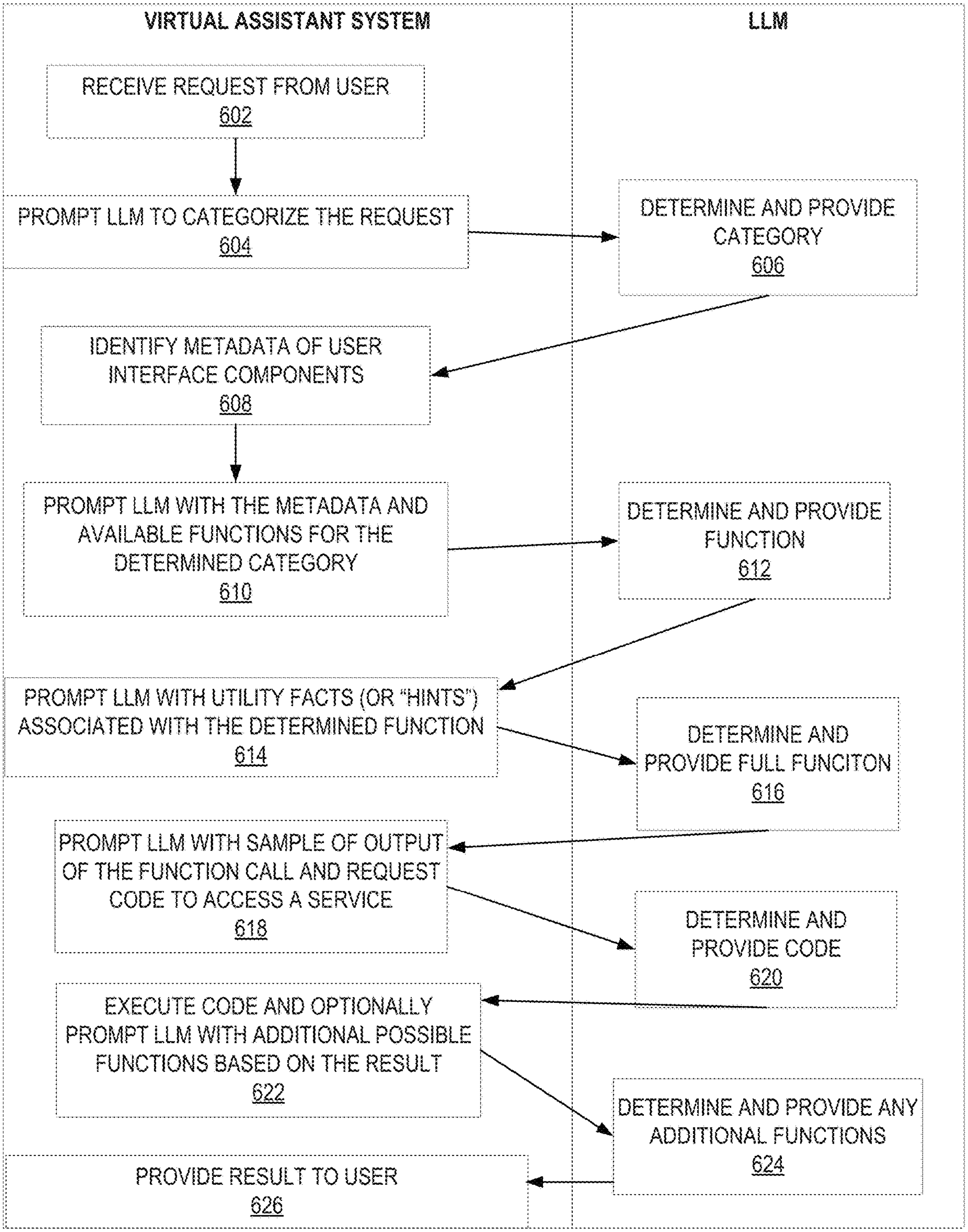
FIG. 6 is a flow diagram illustrating an example workflow that may be performed by a virtual assistant system in communication with an LLM.

FIG. 6 is a flow diagram illustrating an example workflow that may be performed by an Application Assistant System in communication with an LLM. In this example, the Application Assistant System actions are in the left column and the LLM actions are in the right column. Depending on the embodiment, the blocks illustrated in FIG. 6, or similar methods, may include fewer or additional blocks and/or the blocks may be performed in different orders. Additionally, block/functions indicated as being performed by the Application Assistant System may be performed by another system, such as in communication with the AAS 110 and/or at the request of the AAS 110.

The example of FIG. 6 will be discussed with reference to an example software application and user interface of a fleet management application, such as is discussed elsewhere herein. For example, with the user interface of FIG. 3 displayed on a user device 150 of a fleet supervisor, the user (e.g., the fleet supervisor) may provide a query to the AAS 110 of "what's the size of my fleet?" Using the example of FIG. 6, the question will be answered through multiple rounds of communications between the AAS 110 and the LLM 130. Although FIG. 6 is discussed with reference to the specific example user interface and user query, the workflow of FIG. 6 is applicable to any other user interface and user query or request.

Beginning at block 602, the AAS 110 receives the request from the user device 150. For example, the user may select an icon or link labelled "chat with AI" or similar to initiate communication with the AAS 110. The user may then speak or type a question (e.g., "what's the size of my fleet?).

Next, at block 604, the AAS 110 prompts the LLM 130 to categorize the user request. This categorization is considered an index turn with the LLM 130 that allows more relevant information about the user's query to be provided to the LLM 130 in a subsequent prompt. As one example, the index prompt to the LLM 130 may include information such as is illustrated in FIG. 7. In some implementations, the information provided to the LLM 130 is strictly text, without formatting. For ease of illustration, certain terms in FIG. 7 and other figures that illustrate communications to/from an LLM 130 have been formatted, such as by bolding of certain terms in FIG. 7. As shown in FIG. 7, the index prompt starts by addressing the LLM 130 and then provides contextual information 710 regarding the prompt, which in this case comprises the actual and/or a compressed version, of the conversation so far. In this example, the conversation so far includes only a request from the user regarding the size of the fleet. As part of this example categorization prompt, the AAS 110 provides the available categories 720 that may be returned by the LLM, including a brief description of each of the categories.

Next, the LLM 130 at block 606 determines the appropriate category, based on information included in the index prompt (FIG. 7), and sends the category selection back to the AAS 110. For the example user query in FIG. 7, the LLM 130 may respond at block 606 with: "Live Data Lookup", indicating the live data lookup category 722 has been selected.

Next, at block 608, metadata of user interface components of the current user interface are identified. As noted elsewhere herein, the component metadata may be received at the AAS 110 from the user device 150, such as with the initial request from the user device 150 that is received at block 602. Alternatively, the AAS 110 may query the user device 150 for the components and/or component metadata at block 608. The AAS 110 may be configured to look up and/or otherwise determine component metadata based on indications of components of the current user interface, such as based on a listing of component identifiers that is received from the user device.

Next, at block 610, the LLM 130 is prompted with the component metadata and available functions for the category determined at block 604. Accordingly, the LLM 130 may limit its output to only those facts, data links, actions, etc. in the relevant component metadata, as well as any available functions associated with the category that is most relevant to the user query.

Figure 8:
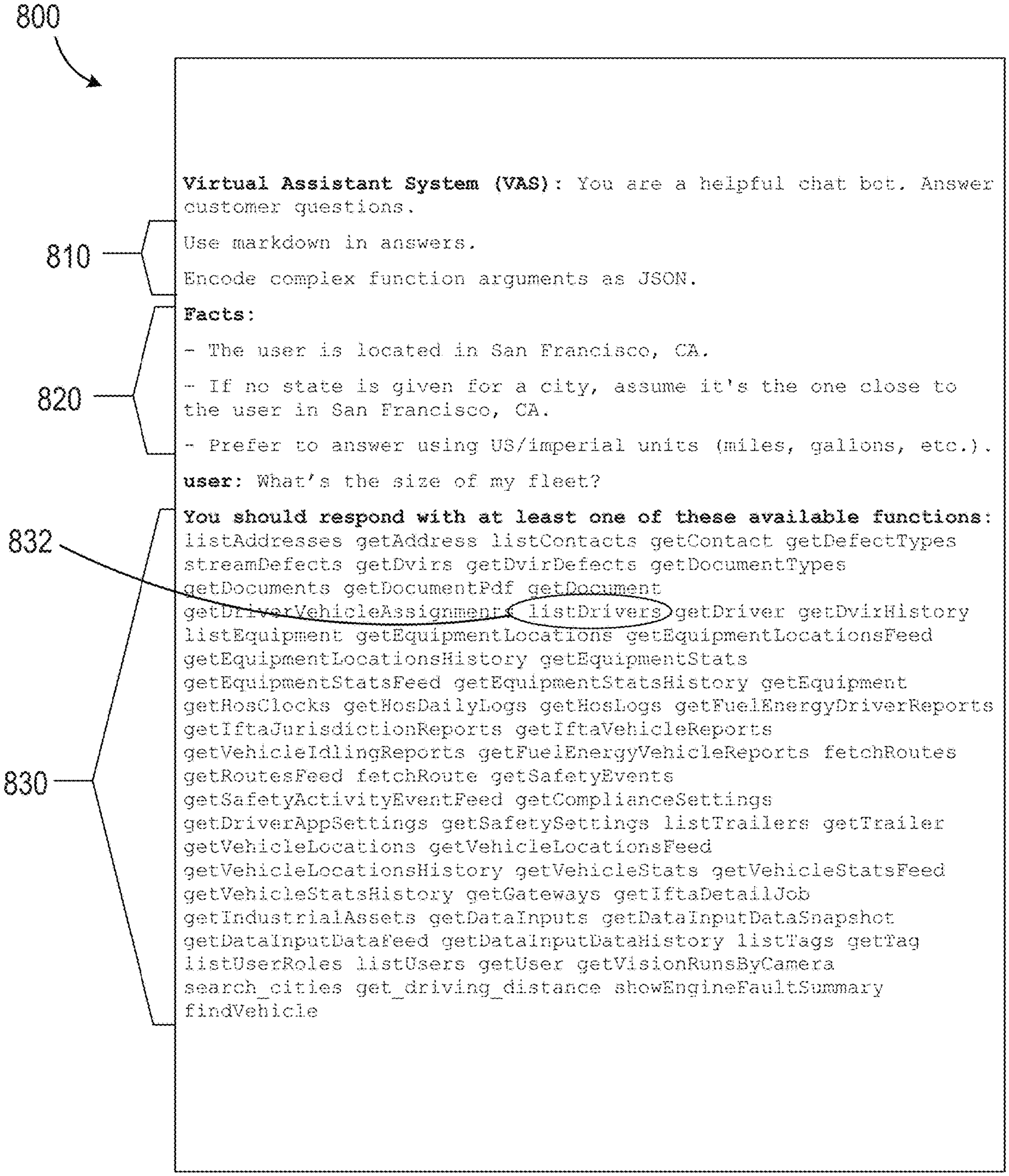
FIG. 8 is another example of a prompt to the LLM.

FIG. 8 is an example of a prompt that may be transmitted to the LLM 130 at block 610. In this example, the AAS 110 has provided some further instructions 810 regarding format of the response that should be provided by the LLM, such as to indicate that markdown should be used and that the LLM 130 should encode complex function arguments as JSON. The prompt then includes component metadata 820 that was identified at block 608, that is, component metadata associated with the components currently displayed on the user device 150 and/or one or more components of particular interest that are displayed on the user device 150, such as a component closest to the pointer/cursor, a last used component, etc. In this example, the component metadata 820 includes facts, including information regarding the user's location. The example prompt also includes a fact that was not directly indicated in the component metadata, but that may be determined based on the category of the user query and/or the available functions that are provided. In this particular example, the fact: "Prefer to answer using US/imperial units (miles, gallons, etc.)." may be added by the AAS 110 based on the location of the user (e.g., in the US) or default preferences of the live data lookup category. The prompt 800 then includes a listing of the available functions 830 that may be returned by the LLM. In some embodiments, the functionality of each of the available functions is evident based on the name of the functions, but in other embodiments a separate listing of certain or all of the available functions along with their functionality may be provided also to aid the LLM 130 in selecting the most appropriate functions.

At block 612, the LLM 130 determines the appropriate function, based on information included in the function selection prompt (FIG. 8), and sends the function selection back to the AAS 110. For this example, the LLM 130 may return: "API: listDrivers" (as included at 832 of FIG. 8) to indicate that an API that acquires a listing of drivers should be performed.

Next, at block 614, the AAS 110 generates another prompt to the LLM, now including a full function definition as well as any utility facts, or hints, associated with the determined function. In return, the LLM 130 should provide back an updated function based on the additional information provided in this prompt. For example, continuing with the example discussed above, the additional utility facts included in this prompt may indicate:

The current date and time is 2023-11-01T00:00:00Z

Unless mentioned otherwise, fetch data for the past month: startTime=2023-10-01T00:00:00Z and endTime=2023-10-30T00:00:00Z In some embodiments, the response provided by the LLM 130 at block 616 may be the same or similar to the response provided at block 612, but in other examples the full function provided at 616 may be updated and/or may more accurately define the requested function. For purposes of the current example, the LLM 130 may return the same function: "API: listDrivers" to indicate that an API that requires a listing of drivers should be performed.

Next, at block 618, another prompt to the LLM 130 is generated, now with a sample of the output of the function call that is expected, along with a request for code that may be executed by the AAS 110 to access a service (e.g., the service identified in the function). FIG. 9 provides an example of this prompt, which includes a sample of the results of the function call 910 and a request to provide code 920, in Python in this example, to provide any necessary computation, filtering, and/or organization of results in the indicated format. In some embodiments, if data received from a tool call is above a certain size threshold, the sample data sent to the LLM is an abbreviated version of that data, such as a truncated or otherwise shorted version of the response from the tool call. If data received from the tool call is below the size threshold, all of the response data may be provided to the LLM. In some embodiments, lists that are provided to the LLM 130 are pre-numbered, rather than relying on the LLM 130 to number the list items.

At block 620, the LLM 130 generates Python code in the format requested, based on the information provided in the prompt at block 618, and returns the resulting code to the AAS 110. For example, the response from the LLM 130 at block 620 may include:

```
API: python(code='''
def process_data(result):
    #Assuming the 'result' is a list of drivers with their
        assigned vehicles
    fleet_size=len({driver['staticAssignedVehicle']['id']
        for driver in result if 'staticAssignedVehicle' in
        driver})
    return fleet_size'''}}
```

Advantageously, this Python code may be executed by the AAS 110, at block 622, to interface with a service, such as an external database that stores vehicle and driver information. In the example of FIG. 6, the AAS 110 may optionally provide an additional prompt to the LLM 130 with additional possible functions that are selected based on the result from the data call. For example, the conversation history may be provided back to the LLM, again with a list of the available functions, to allow the LLM 130 to select another function that may be relevant to the user query or, alternatively, for the LLM 130 to provide response text that may be provided to the user. For example, if at block 624 the LLM 130 determines that additional functions are not needed to respond to the user query, the LLM 130 may return result text such as: "The size of your fleet, based on the number of unique vehicles assigned to drivers, is 155."

Figure 10:
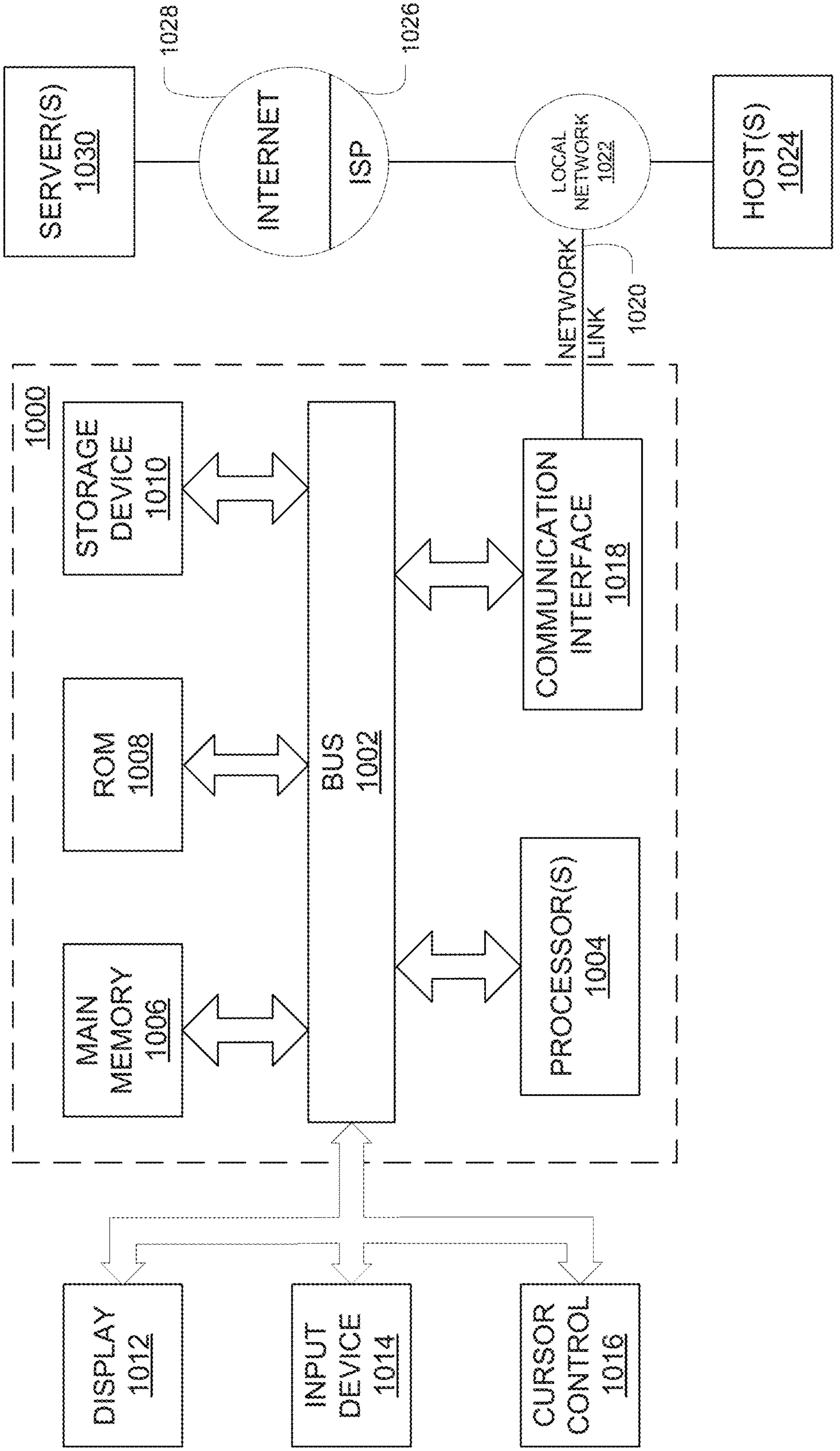
FIG. 10 is a block diagram illustrating an example of a computer system that can be used to perform the functionality described herein.

FIG. 10 is a block diagram that illustrates a computer system 1000 upon which various embodiments of the systems and/or processes illustrated in the figures and/or discussed herein may be implemented. For example, in various examples, the computer components of the user device 150, the AAS 110, the service 170, and/or the LLM 130, may be implemented as computer system 1000, with some, all, and/or additional components and functionality.

Example computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. The main memory 1006 may, for example, include instructions to implement a software application, an application assistant, an LLM, and/or any other computer component in the figures or discussion herein.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicate with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device.

The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method performed by an application assistant computing system, the method including:

receiving, from a user device, an input from a user indicating a query or task;

determining at least two components associated with a user interface displayed on the user device, each of the at least two components providing different user interface functionality;

accessing component metadata of the determined components;

accessing context information associated with the user or user device;

generating a natural language text prompt by combining at least some of the user input, text indicative of at least some of the component metadata, first text indicative of at least some of the context information, and second text indicative of one or more available response elements;

providing the prompt to a large language model (LLM);

receiving an output from the LLM indicating one or more response elements selected by the LLM, wherein a first of the one or more response elements indicates a function call;

generate a second prompt requesting executable code that interacts with an external service to perform the function call, the LLM prompt including one or more examples of outputs;

providing the second prompt to the LLM;

receiving a second output from the LLM including customized executable code that interacts with the external service in accordance with the query or task received from the user;

executing the customized executable code received from the LLM;

receiving, from the external service, additional response elements associated with the query or task received from the user;

generating, based on the one or more response elements and additional response elements, updated user interface code indicating one or more updates to the user interface displayed on the user device; and initiating update of the user interface displayed on the user device according to the updated user interface code.

2. The method of claim 1, wherein the component metadata for each of the at least two components indicating one or more of a fact, a data link, or an action.

3. The method of claim 1, wherein a first response element of the one or more response elements includes a data link query of an external data source.

4. The method of claim 1, wherein in response to determining that a size of the additional response elements is larger than a threshold size, generating and transmitting a processing prompt to the LLM requesting executable code configured to summarize or shorten the additional response elements.

5. The method of claim 1, wherein the at least two components include one or more of: a navigation component, a notification component, a search component, a data item component, a visualization component, or a general component.

6. The method of claim 1, wherein the context information indicates a user-selected component of the user interface.

7. The method of claim 6, wherein the user-selected component is selected by the user selecting a chat button associated with the particular component.

8. The method of claim 6, wherein the user-selected component is selected in response to the user hovering over the particular component.

9. The method of claim 1, wherein at least some of the component metadata is included in metadata associated with the user interface.

10. The method of claim 9, wherein the component metadata is transmitted from the user device to the application assistant computing system.

11. The method of claim 2, wherein the fact includes one or more of information displayed in the user interface, information selected in the user interface, metadata associated with a visualization displayed in the user interface, a user identifier, a user role, or other user information.

12. The method of claim 2, wherein one or more facts includes domain-specific knowledge usable by the LLM to better response to the user input.

13. The method of claim 2, wherein the data link is usable to access a source of information displayed in the user interface.

14. The method of claim 2, wherein the action indicates a user-initiated event including one or more of: initiating a search, initiating a sort, navigating to a different page, filling a form, submitting a form, moving data, or modifying data.

15. The method of claim 1, wherein the updated user interface code includes a textual response to the query or task.

16. The method of claim 1, wherein the prompt includes a contextual hint associated with a data access link, wherein the contextual hint indicates one or more of a required format, criteria to identify incorrect data, or examples of data that is acceptable.

17. The method of claim 1, wherein the user input is initiated based on selection of a chat button or pressing a physical button on the user device.

18. A computing system comprising:

a hardware computer processor; and a non-transitory computer readable medium having software instructions stored thereon, the software instructions executable by the hardware computer processor to cause the computing system to perform operations comprising:

receiving, from a user device, an input from a user indicating a query or task;

determining at least two components associated with a user interface displayed on the user device, each of the at least two components providing different user interface functionality;

accessing component metadata of the determined components;

accessing context information associated with the user or user device;

generating a natural language text prompt by combining at least some of the user input, text indicative of at least some of the component metadata, text indicative of at least some of the context information, and text indicative of one or more available response elements;

providing the prompt to a large language model (LLM);

receiving an output from the LLM indicating one or more response elements selected by the LLM, wherein a first of the one or more response elements indicates a function call;

generate a second prompt requesting executable code that interacts with an external service to perform the function call, the LLM prompt including one or more examples of outputs;

providing the second prompt to the LLM;

receiving a second output from the LLM including customized executable code that interacts with the external service in accordance with the query or task received from the user;

executing the customized executable code received from the LLM;

receiving, from the external service, additional response elements associated with the query or task received from the user;

generating, based on the one or more response elements and additional response elements, updated user interface code indicating one or more updates to the user interface displayed on the user device; and initiating update of the user interface displayed on the user device according to the updated user interface code.

* * * * *